(12) United States Patent
Ng

(10) Patent No.: US 8,490,908 B2
(45) Date of Patent: Jul. 23, 2013

(54) SPINNING REEL DRAG SWITCH DEVICE

(75) Inventor: Keng Huat Ng, Johor (MY)

(73) Assignee: Shimano Components (Malaysia) Sdn. Bhd., Johor (MY)

( * ) Notice: Subject to any disclaimer, the term of this patent is extended or adjusted under 35 U.S.C. 154(b) by 730 days.

(21) Appl. No.: 12/785,924

(22) Filed: May 24, 2010

(65) Prior Publication Data

US 2010/0308148 A1    Dec. 9, 2010

(30) Foreign Application Priority Data

Jun. 8, 2009    (JP) .................................. 2009-137425

(51) Int. Cl.
*A01K 89/01*    (2006.01)
(52) U.S. Cl.
USPC .......................................... 242/246; 242/247
(58) Field of Classification Search
USPC ........................ 242/246, 247, 249, 286, 295
See application file for complete search history.

(56) References Cited

U.S. PATENT DOCUMENTS

| | | | | |
|---|---|---|---|---|
| 5,186,412 | A * | 2/1993 | Park | 242/245 |
| 5,195,698 | A * | 3/1993 | Kyoichi | 242/245 |
| 5,201,477 | A * | 4/1993 | Kawabe | 242/245 |
| 5,511,735 | A * | 4/1996 | Kaneko | 242/245 |
| 5,593,102 | A * | 1/1997 | Yamaguchi | 242/246 |
| 5,816,516 | A * | 10/1998 | Yamaguchi | 242/246 |
| 6,098,908 | A * | 8/2000 | Ng | 242/246 |
| 6,328,239 | B1 * | 12/2001 | Chang | 242/245 |
| 7,721,986 | B2 * | 5/2010 | Shimizu | 242/246 |

FOREIGN PATENT DOCUMENTS

| | | |
|---|---|---|
| EP | 0 985 343 A1 | 3/2000 |
| EP | 1 961 298 A2 | 8/2008 |
| JP | 2008-199979 A | 9/2008 |

OTHER PUBLICATIONS

The extended European Search Report of corresponding European Application No. 10165136.2 dated Sep. 27, 2010.

* cited by examiner

*Primary Examiner* — Emmanuel M Marcelo
(74) *Attorney, Agent, or Firm* — Global IP Counselors, LLP

(57) ABSTRACT

A spinning-reel drag switch device includes a return mechanism. The return mechanism includes a first arm, a second gear member, and a press member. The first arm is configured to pivot in conjunction with the operation member. The second gear member rotates about an axis that is positioned to interpose the rotation shaft between the axis and a spool such that a distance between the axis and a fishing-rod attachment is greater than a distance between a handle rotation shaft and the fishing-rod attachment. The second gear member is configured to receive rotation force from the first gear member. The press member is mounted to the second gear member to press the first arm. The return mechanism presses the first arm in conjunction with rotation of the handle in a fishing line winding direction to return the operation member to a first position from a second position.

12 Claims, 10 Drawing Sheets

SPINNING REEL DRAG SWITCH DEVICE

CROSS-REFERENCE TO RELATED APPLICATIONS

This application claims priority to Japanese Patent Application No. 2009-137425 filed on Jun. 8, 2009, the entirety of which is hereby incorporated by reference in its entirety.

BACKGROUND

1. Field of the Invention

The present invention generally relates to a drag switch device, and particularly to a spinning-reel drag switch device configured to switch between a drag mechanism activation state and a deactivation state, the drag mechanism configured to brake a spool coupled to an oscillation mechanism that is configured to reciprocate the spool back and forth in response to rotation of a handle that is attached to a reel unit of a spinning reel.

2. Background Information

It is well-known that spinning reels are generally provided with a drag mechanism configured to regulate spool rotation in a fishing line release direction. Further, the spinning reels include a drag switch device configured to switch the drag mechanism between a braking state and a non-braking state. For example, Laid-open Japanese Patent Application Publication No. JP-A-2008-199979 describes a spinning reel of the foregoing type.

In the well-known spinning reels, the drag switch device is generally provided with a drag switch lever mounted to a reel unit. The drag switch lever is pivotable between a braking position and a non-braking position. In this case, the braking position corresponds to the foregoing brake state whereas the non-braking position corresponds to the foregoing non-braking state. The drag switch lever includes a shaft part. The shaft part is disposed closer to a fishing-rod attachment than a rotation shaft of the handle (i.e., a master gear shaft) is. In short, the shaft part is positioned higher than the rotation shaft of the handle. Simultaneously, the shaft part is disposed behind the rotation shaft of the handle. Further, the shaft part is disposed in parallel to the master gear shaft. The drag switch lever is configured to pivot between the braking position (corresponding to the braking state) and the non-braking position (corresponding to the non-braking state). The drag switch device includes a switch mechanism and a return mechanism. The switch mechanism is configured to switch the drag mechanism between the braking state and the non-braking state in response to the pivoting of the drag switch lever. On the other hand, the return mechanism is configured to cause the switch mechanism to switch the drag mechanism to the braking state from the non-braking state in conjunction with rotation of the handle in the fishing line winding direction.

The return mechanism includes a second gear member, a kick member, and a return member. The second gear member meshes with a first gear member mounted to the rotation shaft of the handle. The kick member is mounted to the second gear member. The return member is configured to return the drag switch lever to the braking position from the non-braking position in response to action of the kick member. The second gear member is disposed closer to the fishing-rod attachment than the face gear shaft is. Further, the second gear member is disposed between the face gear shaft and the shaft part of the drag switch lever. The return member is unitarily pivotable with the drag switch lever.

In the foregoing return mechanism, the second gear member rotates in response to rotation of the handle in the fishing line winding direction. When the second gear member rotates, the kick member rotates in the same direction as the second gear member and kicks (i.e., hits) the return member. When the return member is hit, the drag switch lever returns to the braking position from the non-braking position.

According to the foregoing drag switch device, the second gear and the kick member are disposed between the face gear shaft and the shaft part of the drag switch lever while being disposed closer to the fishing-rod attachment than the face gear shaft is. The structure achieves a relatively compact disposition of the return mechanism. However, the structure has a drawback in that the kick member and the shaft part are required to be close to each other. This makes it difficult to design a kick member provided with a long arm. Consequently, enough large torque cannot be produced when the kick member hits the return member in response to rotation of the second gear member. In other words, the handle must be strongly rotated in the fishing line winding direction to return the drag switch lever to the braking position from the non-braking position.

In view of the above, it will be apparent to those skilled in the art from this disclosure that there exists a need for an improved spinning-reel drag switch device for reducing the force required for a return action of the drag switch device as much as possible. This invention addresses this need in the art as well as other needs, which will become apparent to those skilled in the art from this disclosure.

SUMMARY

A spinning-reel drag switch device according to a first aspect is a drag switch device configured to switch a first drag mechanism between an activation state and deactivation state. The first drag mechanism is configured to brake a spool attached to a reel unit of a spinning reel. The spinning reel herein includes a fishing-line winding handle and a fishing-rod attachment. Further, the spinning reel is configured to reel out a fishing line forward. The spinning-reel drag switch device includes an operation member, a switch mechanism, and a return mechanism. The operation member is attached to the reel body while being allowed to pivot about a first axis between a first position and a second position that is different from the first position. The first axis is positioned closer to the fishing-rod attachment than a rotation shaft of the handle is. Simultaneously, the first axis is positioned behind and in parallel to the rotation shaft. In other words, the first axis is positioned to extend in parallel to the rotation shaft and to interpose the rotation shaft between the first axis and the spool. The switch mechanism is configured to set the first drag mechanism to be in the activation state when the operation member is pivoted to the first position. Further, the switch mechanism is configured to set the first drag mechanism to be in the deactivation state when the operation member is pivoted to the second position. The return mechanism includes a first arm, a second gear member, and a press member. The first arm is configured to pivot in conjunction with the operation member. The second gear member rotates about a second axis parallel to the first axis. The second axis is positioned behind the rotation shaft. In other words, the second axis is positioned to interpose the rotation shaft between the second axis and the spool. Simultaneously, the second axis is separated farther from the fishing-rod attachment than the rotation shaft is. The second gear member is configured to receive a rotation force from a first gear member unitarily rotatable with the rotation shaft. The press member is mounted to the second gear member for pressing the first arm. The return mechanism is configured to press the first arm in conjunction with rotation of the handle in a fishing line winding direction for returning the operation member to the first position from the second position.

In the spinning-reel drag switch device of the first aspect, the switch mechanism is configured to set the first drag mechanism to be in the activation state when the operation member is pivoted to the first position from the second position. Further, the switch mechanism is configured to set the first drag mechanism to be in the deactivation state when the operation member is pivoted to the second position from the first position. When the handle is rotated in the fishing line winding direction under the condition that the operation member is set to be in the second position, rotation is delivered from the first gear member to the second gear member that is disposed behind the rotation shaft, and is separated farther from the fishing-rod attachment than the rotation shaft of the handle is. When rotation is delivered to the second gear member from the first gear member, the press member is rotated in the same direction as the second gear member. The press member accordingly presses the first arm to return the operation member to the first position from the second position. When the operation member is returned to the first position, the first drag mechanism is switched to the activation state from the deactivation state. For example, when the first drag mechanism is a front drag mechanism for directly braking the spool, the front drag mechanism is set to be in the activation state. Alternatively, when the first drag mechanism is a rear drag mechanism for indirectly braking the spool through the spool shaft, the rear drag mechanism is set to be in the activation state.

According to the spinning-reel drag switch device of the first aspect, the first axis (i.e., the pivot center of the operation member) and the second axis (i.e., the rotation center of the second gear member) are positioned behind the rotation shaft. Further, the first axis is positioned higher than the rotation shaft whereas the second axis is positioned lower than the rotation shaft. Simultaneously, the first axis is positioned closer to the fishing-rod attachment than the second axis is. This structure enables allows for a long distance from the rotation center of the second gear member to the pivot center of the operation member. Therefore, with this structure, it is possible to have a long distance from the rotation center of the second gear member to a position where the press member presses the first arm. Consequently, a large torque is delivered to the first arm when the press member is rotated in conjunction with rotation of the second gear member and presses the first arm. In other words, even if the handle is rotated with a small force, a large force is applied to the return action to return the drag switch lever to the locked position from the unlocked position. It is thereby possible to reduce the force required for a return operation of the drag switch device as much as possible. As another advantageous effect, durability (e.g., abrasion durability) of the press member and the first arm is enhanced because it is possible to reduce stress applied between the first arm and the press member in a return operation even if the torque to be delivered is constant.

A spinning-reel drag switch device according to a second aspect relates to the spinning-reel drag switch device of the first aspect, wherein the second gear member meshes with the first gear member and forms a part of an oscillation mechanism configured to reciprocate the spool back and forth. The press member is coupled to the second gear member while being relatively rotatable with the second gear member in a predetermined angle range, and unitarily rotatable outside the predetermined range.

According to the spinning-reel drag switch device, the operation member can be pivoted to the first position from the second position with the use of a component forming the oscillation mechanism. Therefore, preparing a gear member exclusively for pivoting the operation member is not required. In other words, the structure of the return mechanism is simplified. Further, the press member is mounted to the oscillation second gear member with a relatively large diameter. Therefore, the press member can be formed with a large outline.

A spinning-reel drag switch device according to a third aspect relates to the spinning reel drag switch device of the second aspect, wherein the switch mechanism includes the rotation member and the lock member. The rotation member is selectively unitarily rotatable with or rotatable with respect to a spool shaft that the spool is coupled to the distal end thereof. Simultaneously, the rotation member is mounted to the reel unit while being prevented from moving back and forth. Further, the rotation member has a plurality of interlock portions circumferentially formed on the outer periphery thereof at predetermined intervals. The lock member is movable to an interlock position and a separate position. The interlock position allows the lock member to be interlocked with any one of the plurality of interlock portions for preventing rotation of the rotation member. On the other hand, the separate position allows the lock member to be separated from the rotation member to allow rotation of the rotation member. The lock member is configured to move to the interlock position or the separate position in conjunction with pivoting of the operation member to the first position or the second position.

According to the spinning-reel drag switch device of the third aspect, the lock member is moved to the interlock position and accordingly interlocked with any one of the interlock portions of the rotation member when the operation member is pivoted to the first position from the second position. Consequently, the rotation member is locked and prevented from rotating by the lock member. When the rotation member is herein attached to the spool while being unitarily rotatable with it, the spool shaft is prevented from rotating. Accordingly, the first drag mechanism (e.g., a front drag mechanism for directly braking the spool) is set to be in the activation state. On the other hand, when the rotation member is attached to the spool shaft in a relatively rotatable state, the rotation member is prevented from rotating while being rotatable with respect to the spool shaft. Accordingly, the drag mechanism (e.g., a rear drag mechanism for indirectly braking the spool through the spool shaft) is set to be in the activation state.

Again, when the operation member is pivoted to the second position from the first position, the lock member is moved to the separate position and separated from any one of the interlock portions of the rotation member. Accordingly, interlocking by the lock member is released and the rotation member is allowed to rotate. When the rotation member is herein attached to the spool shaft while being unitarily rotatable with it, the spool shaft is allowed to rotate. Therefore, the drag mechanism (e.g., the front drag mechanism for directly braking the spool) is set to be in the deactivation state. On the other hand, when the rotation member is attached to the spool shaft in a rotatable state, the rotation member is allowed to rotate while being rotatable with respect to the spool shaft. Therefore, the drag mechanism (e.g., the rear drag mechanism for indirectly braking the spool through the spool shaft) is set to be in the deactivation state.

A spinning-reel drag switch device according to a fourth aspect relates to the spinning-reel drag switch device of the third aspect, wherein the press member is coupled to the second gear member while being rotatable in a predetermined angle range. In addition, the return mechanism further includes a first urging member to urge the press member in a rotation direction, corresponding to the fishing line winding direction, of the second gear member.

According to the spinning-reel drag switch device of the fourth aspect, the press member is rotatable in a predetermined angle range with respect to the second gear member while being urged by the first urging member in the rotation direction corresponding to the fishing line winding direction. Therefore, even when the press member is pressed by the first arm in conjunction with pivoting of the operation member to the second position from the first position, the press member can move along the first arm in such a way that the press member avoids press-contact with the first arm. Accordingly, even if the operation member is handled during activation of an anti-reverse device, the first arm is not pushed back by the press member.

A spinning-reel drag switch device according to a fifth aspect relates to the spinning-reel drag switch device of one of the third or fourth aspects, wherein the second gear member includes a cam protrusion on a first surface thereof. The cam protrusion is interlocked with a cam receiver formed on a slider of the oscillation mechanism for reciprocating the spool back and forth in response to rotation of the handle. Further, the press member is coupled to a second surface, opposed to the first surface, of the second gear member.

According to the spinning-reel drag switch device of the fifth aspect, the cam protrusion is disposed on one surface of the second gear member, whereas the press member is disposed on the other surface of the second gear member. Accordingly, the coupling structure of the press member is simplified.

A spinning-reel drag switch device according to a sixth aspect relates to the spinning-reel drag switch device of one of the third to fifth aspects, wherein the operation member includes a shaft part, an operation part, and a second arm. The shaft part is disposed along the first axis. The shaft part is provided with the first arm. The shaft part is attached to the reel unit in a rotatable state. The operation part is mounted to the shaft part while being unitarily rotationally movable with the shaft part. The operation part extends from the shaft part in a radial outward direction. The operation part has a distal end outwardly protruding from the reel unit. The second arm is mounted to the shaft part while being unitarily rotatable with the shaft part. The second arm is configured to press the lock member to the separate position from the interlock position. The switch mechanism includes a second urging member for urging the lock member towards the interlock position.

According to the spinning-reel drag switch device of the sixth aspect, the lock member is urged towards the interlock position while being pressed by the second arm towards the separate position. Therefore, the lock member is urged by the second urging member in conjunction with rotation of the rotation member and meshes with any one of the interlock portions, even if the second arm presses the lock member to a position where the lock member does not mesh with any one of the interlock portions of the rotation member.

A spinning-reel drag switch device according to a seventh aspect relates to the spinning-reel drag switch device of one of the third to sixth aspects, and further includes a tubular member attached to the spool shaft while being axially movable and unitarily rotatable with the spool shaft. The tubular member is prevented from moving back and forth with respect to the reel unit. Further, the rotation member is attached to the outer peripheral surface of the tubular member while being unitarily rotatable with or rotatable with respect to the tubular member.

According to the spinning-reel drag switch device of the seventh aspect, the rotation member is attached to the tubular member, and the tubular member is attached to the spool shaft while being allowed to rotate unitarily with the spool shaft but prevented from moving back and forth with respect to the reel unit. Therefore, the foregoing structure enables the drag mechanism, including the rotation member as a component thereof, to have a simplified structure by attaching drag washers to the tubular member.

A spinning-reel drag switch device according to an eighth aspect relates to the spinning-reel drag switch device of one of the third to seventh aspects, wherein the spinning reel further includes a second drag mechanism for braking the spool shaft. Further, the rotation member is mounted to the spool shaft while being unitarily rotatable with the spool shaft. The second drag mechanism is set to be in the activation state when rotation of the rotation member is allowed in conjunction with separation of the lock member from any one of the interlock portions of the rotation member.

According to the spinning-reel drag switch device of the eighth aspect, the rotation member is unitarily rotatable with the spool shaft. Therefore, the spool shaft, together with the rotation member, is rotatable with respect to the reel unit in response to an interlocking release of the lock member. Accordingly, the second drag mechanism (e.g., the rear drag mechanism for braking the spool shaft) is set to be in the activation state.

A spinning-reel drag switch device according to a ninth aspect relates to the spinning-reel drag switch device of the eighth aspect, wherein the spool is attached to the distal end of the spool shaft through the first drag mechanism in a rotatable state. Further, the first drag mechanism is set to be in the activation state when rotation of the rotation member is prevented in conjunction with interlocking of the lock member with any one of the interlock portions of the rotation member.

According to the spinning-reel drag switch device of the ninth aspect, the spool shaft is prevented from rotating with respect to the reel unit when the rotation member is prevented from rotating. In response to this, the first drag mechanism (e.g., the front drag mechanism for directly braking the spool between the spool and the spool shaft) is set to be in the activation state. Therefore, the first drag mechanism and the second drag mechanism can be activated or deactivated in conjunction with an interlocking or interlocking release of the rotation member.

A spinning-reel drag switch device according to a tenth aspect relates to the spinning-reel drag switch device of one of the third to seventh aspects, wherein the spinning reel further includes a second drag mechanism for braking the spool shaft, and the rotation member is mounted to the spool shaft in a rotatable state and forms a part of the first drag mechanism. Further, the first drag mechanism is set to be in the deactivation state when rotation of the rotation member is allowed in conjunction with separation of the lock member from any one of the interlock portions of the rotation member, whereas the first drag mechanism is set to be in the activation state when rotation of the rotation member is prevented in conjunction with interlocking of the lock member with any one of the interlock portions of the rotation member.

According to the spinning-reel drag switch device of the tenth aspect, the rotation member is configured to be rotatable with respect to the spool shaft. When the rotation member is locked, the spool shaft is configured to be rotatable relative to the rotation member. Accordingly, the first drag mechanism is set to be in the activation state.

Further, the first axis (i.e., the pivot center of the operation member) and the second axis (i.e., the rotation center of the second gear member) are positioned behind the rotation shaft. Simultaneously, the first axis is positioned higher than the rotation shaft whereas the second axis is positioned lower than the rotation shaft. In other words, the first axis is positioned closer to the fishing-rod attachment than the second axis is. This structure allows for a long distance from the rotation center of the second gear member to the pivot center of the operation member. Therefore, it is possible to produce a structure having a long distance from the rotation center of the second gear member to a position where the press member presses the first arm. Consequently, a large torque is delivered to the first arm when the press member is rotated in conjunction with rotation of the second gear member and presses the first arm. Therefore, the return mechanism can be relatively compactly disposed. Furthermore, with this structure, even if the return mechanism is relatively compact and the handle can be rotated with a small force, a large force is applied to the return action to return the lock member to the interlock position from the separate position. It is thereby possible to reduce the force required for a return operation of the drag switch device as much as possible. As another advantageous effect, durability (e.g., abrasion durability) of the press member and the first arm will be enhanced because it is possible to reduce stress to be applied between the first arm and the press member in a return operation even if torque to be delivered is constant.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Entire Structure

Figure 1:
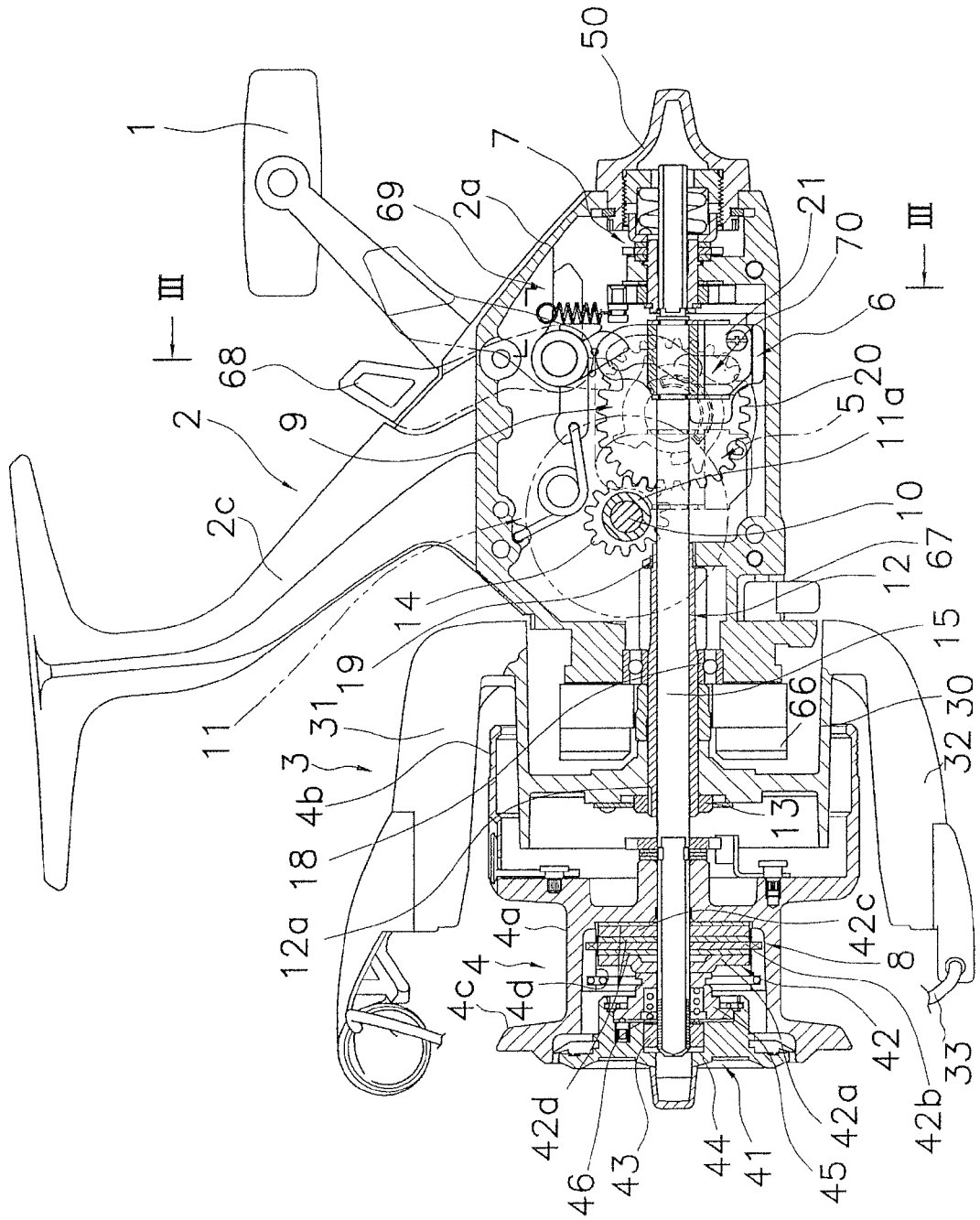
FIG. 1 is a cross-sectional side view of a part of a spinning reel according to a first exemplary embodiment.

FIG. 1 illustrates a spinning reel according to a first exemplary embodiment. The spinning reel includes a handle 1, a reel unit 2, a rotor 3, and a spool 4. The rotor 3 supports the handle 1 in a rotatable state. The rotor 3 is supported at the front of the reel unit 2 in a rotatable state. The spool 4 winds a fishing line onto its outer periphery. The spool 4 is disposed on the front of the rotor 3.

Figure 3:
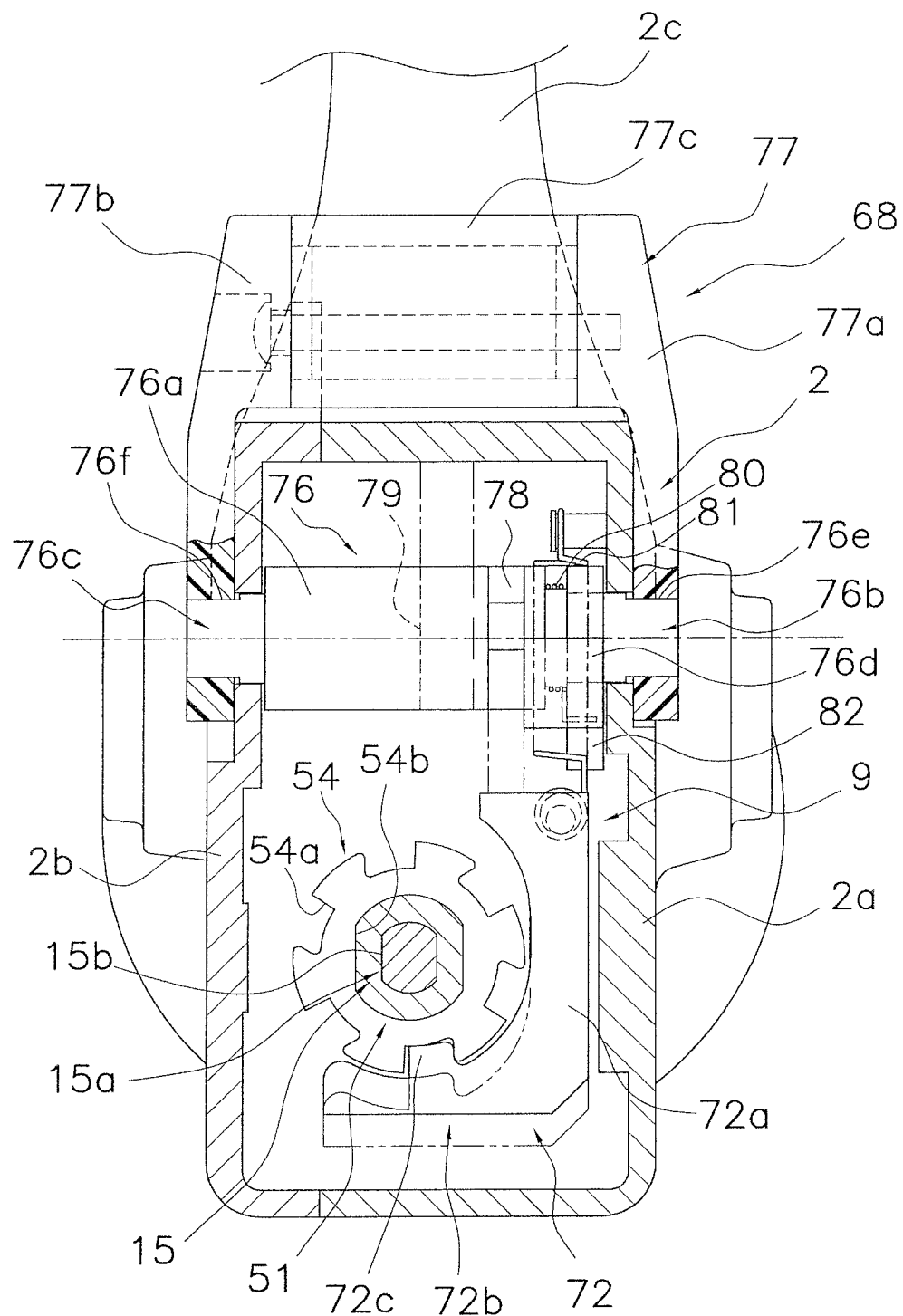
FIG. 3 is a cross-sectional rear view of the spinning reel illustrated in FIG. 1, sectioned along line III-III.

As illustrated in FIGS. 1 and 3, the reel unit 2 includes a reel body 2a and a lid member 2b. The reel body 2a is provided with various mechanisms attached thereto. The lid member 2b is detachably attached to the reel body 2a. When the lid member 2b is attached to the reel body 2a, a mechanism housing hollow space is produced therein for containing various mechanisms.

The reel body 2a is made of synthetic resin or metal such as aluminum alloy, whereas the lid member 2b is made of metal such as aluminum alloy. Further, a fishing rod attachment 2c (see FIG. 1) is integrally formed with the reel body 2a or the lid member 2b. It should be noted that the fishing rod attachment 2c is integrally formed with the reel body 2a in the present exemplary embodiment. Specifically, the fishing rod attachment 2c is a roughly T-shaped part that extends from the top of the reel body 2a in a rear-to-front direction.

The mechanism housing hollow space contains a rotor drive mechanism 5, an oscillation mechanism 6, and a drag switch device 9. The rotor drive mechanism 5 is configured to rotate the rotor 3 in conjunction with rotation of the handle 1. The oscillation mechanism 6 is configured to move the spool 4 back and forth to wind uniformly the fishing line onto it. The drag switch device 9 is configured to activate and to deactivate a rear drag mechanism 7 and a front drag mechanism 8. The rear drag mechanism 7 (an example of a second drag mechanism) is configured to brake the spool 4. On the other hand, the front drag mechanism 8 (an example of a first drag mechanism) is configured to brake the spool 4 with a braking force greater than that of the rear drag mechanism 7.

Figure 2:
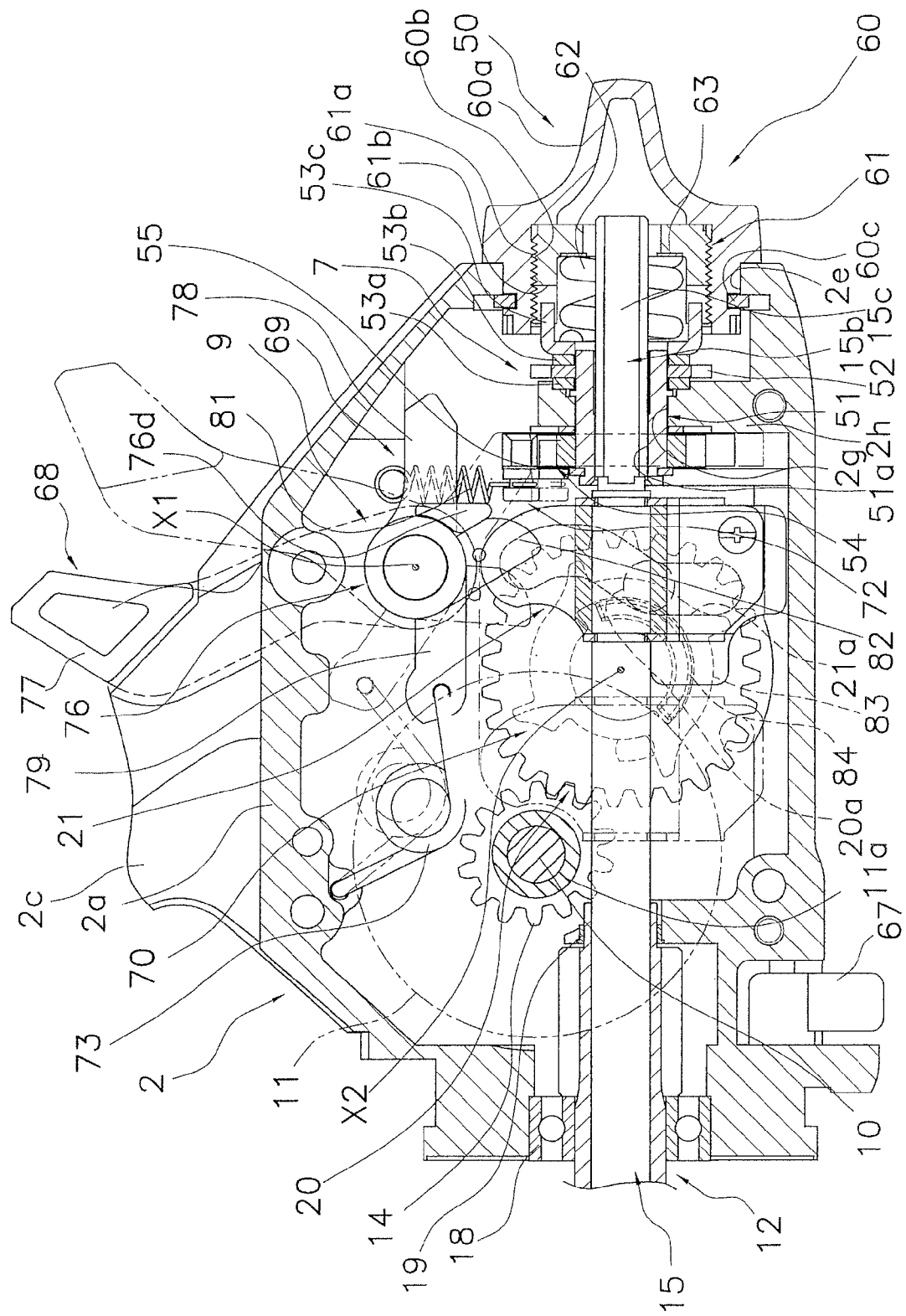
FIG. 2 is a cross-sectional side view of the rear part of a reel unit of the spinning reel.
Figure 4:
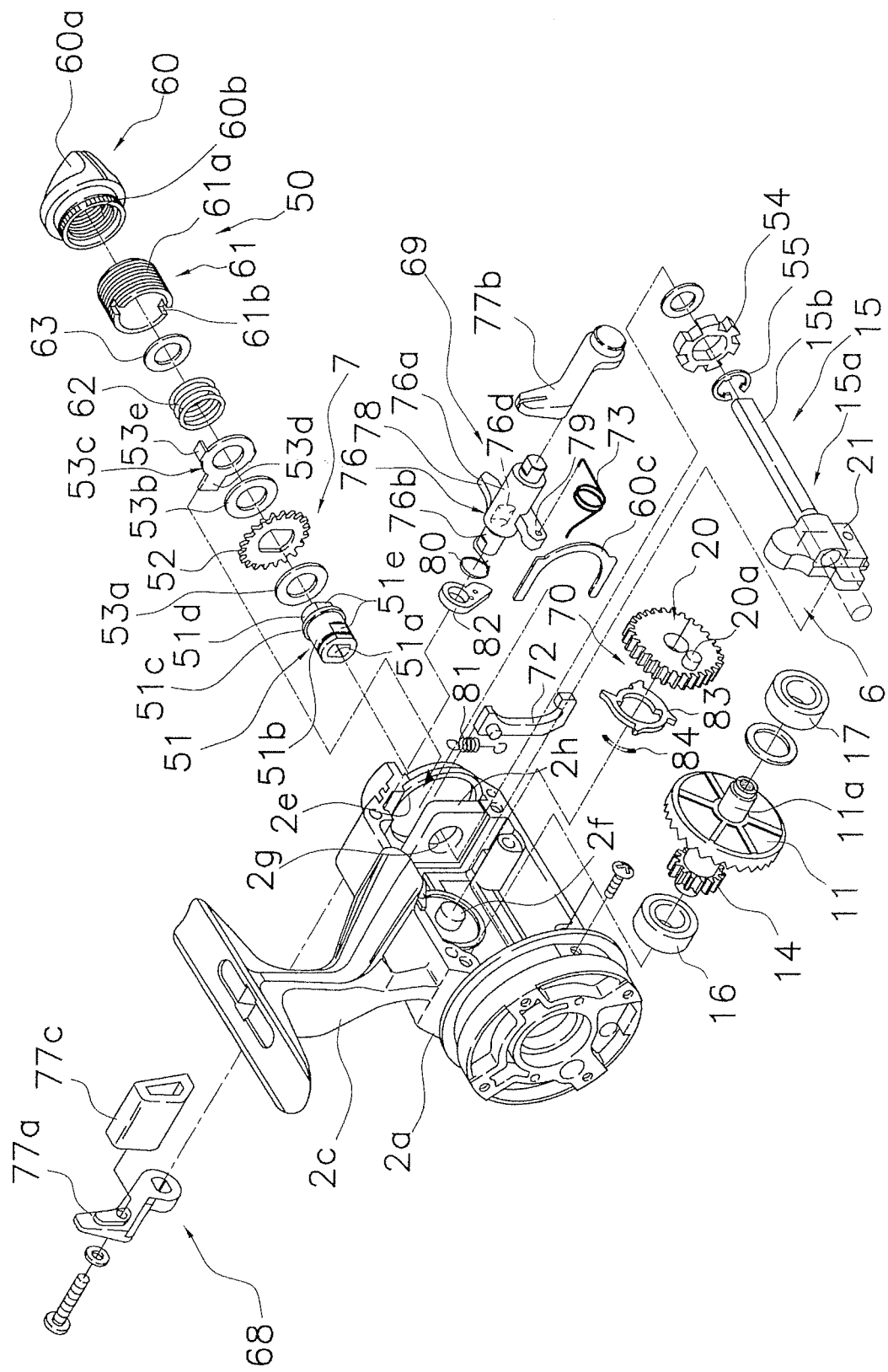
FIG. 4 is an exploded perspective view of a rear drag mechanism and a drag switch device of the spinning reel.

As illustrated in FIGS. 1, 2, and 4, the rotor drive mechanism 5 includes a handle shaft 10, a face gear 11, and a pinion gear 12. The handle shaft 10 is provided for attaching the handle 1 thereto while the handle 1 is unitarily rotatable with the handle shaft 10. The face gear 11 rotates together with the handle shaft 10. The pinion gear 12 meshes with the face gear 11. The face gear 11 is integrally formed with a face gear shaft 11a, and can be formed as a unitary one piece member. Alternatively, the face gear 11 and the face gear shaft 11a may be formed as separate individual components. Either of the distal ends of the face gear shaft 11a is screwed onto the handle shaft 10 of the handle 1. The face gear shaft 11a is supported in a rotatable state by the reel body 2a and the lid member 2b through a bearing 16 and a bearing 17 (see FIG. 4). The pinion gear 12 includes a cylindrical part in its interior for allowing a spool shaft 15 to pass through. Further, the pinion gear 12 includes a front part 12a that passes through the center part of the rotor 3. The front part 12a is fixed to the rotor 3 by way of a nut 13. An axial intermediate part of the pinion gear 12 is supported in a rotatable state by the reel body 2a through a bearing 18. Similarly, an axial rear part of the pinion gear 12 is supported in a rotatable state by the reel body 2a through a bearing 19.

The oscillation mechanism 6 is configured to reciprocate the spool shaft 15 back and forth for moving the spool 4 in the same direction as the spool shaft 15. The spool 4 is coupled to the distal end of the spool shaft 15 through the front drag mechanism 8. The oscillation mechanism 6 receives the rotation delivered through a driving gear 14 attached to the face gear shaft 11a (an example of a rotation shaft of a handle). As stated, the face gear shaft 11a can be integrally formed with the face gear 11. For example, the handle shaft 10 with a built-in spring is coupled to the face gear shaft 11a while being unitarily rotatable with it.

The oscillation mechanism 6 includes a cam gear 20 and a slider 21. The cam gear 20 (an example of a second gear member) meshes with the driving gear 14 (an example of a first gear member) mounted onto the face gear shaft 11a. The slider 21 is configured to reciprocate back and forth in conjunction with rotation of the cam gear 20. The driving gear 14 may be integrally formed with the face gear shaft 11a. Alternatively, the driving gear 14 and the face gear shaft 11a may be produced as separate individual components. The driving gear 14 unitarily rotates with the face gear shaft 11a. For example, the driving gear 14 can be a gear preferably having a pitch circle defined by the gear teeth that has non-circular or out of round shape, and more preferably being an oval with two sides. The spool shaft 15 is coupled to the slider 21 while being allowed to rotate but prevented from axially moving. The slider 21 includes a cam receiver part 21a on its second surface (i.e., a surface opposed to the surface illustrated in FIG. 2). The cam receiver part 21a is a groove formed in a modified question-mark ("?") shape.

The center of the cam gear 20 is separated farther from the fishing rod attachment 2c than the face gear shaft 11a is. Further, the cam gear 20 is disposed behind the face gear shaft 11a, or such that the face gear shaft 11a is between the cam gear 20 and the spool 4. For example, the cam gear 20 can be a gear preferably having a pitch circle defined by the gear teeth that has non-circular or out of round shape, and more preferably being a rounded square or rectangle with four sides. The cam gear 20 is attached to a gear shaft 2f while being rotatable about a second axis X2 parallel to the face gear shaft 11a. The gear shaft 2f protrudes from the inner surface of the reel body 2a. The cam gear 20 includes a cam protrusion 20a on its first surface (i.e., the surface facing the slider 21 illustrated in FIG. 2). The cam protrusion 20a extends from the first surface of the cam gear 20 in the same direction in which the gear shaft 2f protrudes. The earn protrusion 20a can extend parallel or substantially parallel to the second axis X2. The cam protrusion 20a is engaged with the cam receiver part 21a of the slider 21. The cam gear 20 includes a member attachment portion 20b (see FIG. 5) on its second surface opposed to its first surface. The member attachment portion 20b protrudes from the second surface of the cam gear 20 in a roughly circular shape. The press member 83 of a return mechanism 70 described below is attached to the member attachment portion 20b. The member attachment portion 20b will be explained in detail in describing the return mechanism 70.

As illustrated in FIG. 1, the rotor 3 includes a cylindrical part 30, a first rotor arm 31, and a second rotor arm 32. The first and second rotor arms 31 and 32 are integrally formed with the cylindrical part 30. The first and second rotor arms 31 and 32 are extended forward from the rear end of the cylindrical part 30 while being laterally separated from the cylindrical part 30. Further, a bail arm 33 is attached to both of the tips of the first and second rotor arms 31 and 32 while being pivotable between a fishing line winding posture and a fishing line release posture. The bail arm 33 guides the fishing line for winding it onto the spool 4 in response to rotation of the rotor 3.

The cylindrical part 30 of the rotor 3 contains an anti-reverse mechanism 66. The anti-reverse mechanism 66 is configured to prevent and to allow reverse rotation of the rotor 3. The anti-reverse mechanism 66 includes a roller-type one-way clutch. The anti-reverse mechanism 66 is configured to activate and to deactivate the one-way clutch in response to handling of a switch lever 67 for respectively preventing and allowing reverse rotation of the rotor 3. The switch lever 67 is attached to the bottom of the front part of the reel unit 2 in a pivotable state.

The spool 4 is disposed between the first rotor arm 31 and the second rotor arm 32 of the rotor 3. The spool 4 is attached to the distal or front end of the spool shaft 15 in a relatively rotatable state. Further, the spool 4 is coupled to the spool shaft 15 through the front drag mechanism 8. The spool 4 includes a bobbin trunk 4a, a skirt 4b, and a flange 4c. The bobbin trunk 4a is used for winding the fishing line onto its outer periphery. The skirt 4b extends from the rear end of the bobbin trunk 4a while being integrally formed with the bobbin trunk 4a. The flange 4c is formed on the front end of the bobbin trunk 4a while being integrally formed with the bobbin trunk 4a. The bobbin trunk 4a includes a drag housing recess 4d in its interior. The drag housing recess 4d is a circular recess that contains a front friction part 42 described below. The spool 4 is selectively braked by the front drag mechanism 8 and the rear drag mechanism 7. It should be noted that the braking force of the rear drag mechanism 7 is herein less than that of the front drag mechanism 8.

Front Drag Mechanism Structure

The front drag mechanism 8 is attached to the distal or front end of the spool shaft 15. The front drag mechanism 8 includes a front drag knob 41 and the front friction part 42. The front drag knob 41 is screwed onto the spool shaft 15. The front drag knob 41 serves to regulate drag force. The front friction part 42 is pressed by the front drag knob 41. The front drag knob 41 includes a knob body 44 and a press portion 45. The knob body 44 contains a nut 43 in its interior. Specifically, the nut 43 is screwed onto the spool shaft 15 and is attached to the knob body 44 while being axially movable and unitarily rotatable with it. The press portion 45 is interlocked with the knob body 44 while being allowed to rotate but prevented from axially moving. In addition, the press portion 45 is unitarily rotatable with the spool shaft 15. The press portion 45 is configured to make contact with the front friction part 42 for braking the spool 4. Further, a coil spring 46 is disposed in a compressed state between the nut 43 and the press member 45 while being disposed around the outer peripheral surface of the spool shaft 15.

For example, the front friction part 42 includes a first drag washer 42a, a second drag washer 42b, and a third drag washer 42c. The first drag washer 42a makes contact with the press portion 45. The first drag washer 42a is, for instance, coupled to the spool shaft 15 while being unitarily rotatable with it. The second drag washer 42b is, for instance, coupled to the spool 4 while being unitarily rotatable with it. The third drag washer 42c is, for instance, coupled to the spool shaft 15 while being unitarily rotatable with it. Further, drag discs 42d are disposed between the first drag washer 42a and the second drag washer 42b, between the second drag washer 42b and the third drag washer 42c, and between the third drag washer 42c and a wall of the drag housing recess 4d, respectively. The drag discs 42d are made of material such as graphite or felt.

Rear Drag Mechanism Structure

The rear drag mechanism 7 is configured to generate braking force less than that of the front drag mechanism 8. The rear drag mechanism 7 is mainly used for casting to allow a live prey to swim in the water. As illustrated in FIGS. 2 and 4, the rear drag mechanism 7 is attached to a rear part 15a of the spool shaft 15. The rear drag mechanism 7 includes a rear drag knob 50, a tubular member 51, a click gear 52, a fourth drag washer 53a, a fifth drag washer 53b, and a sixth drag washer 53c. The rear drag knob 50 is screwed into the reel unit 2 and serves to regulate drag force. The tubular member 51 is attached to the rear part 15a of the spool shaft 15 while being axially movable and unitarily rotatable with the spool shaft 15. The click gear 52 is attached to the outer peripheral surface of the rear part of the tubular member 51 while being unitarily rotatable with the tubular member 51. The fourth drag washer 53a and the fifth drag washer 53b are disposed on both axial sides of the click gear 52 while making contact with them.

The rear drag knob 50 is attached to an attachment hole 2e formed on the rear surface of the reel body 2a while being allowed to rotate but prevented from axially moving. The rear drag knob 50 includes a knob body 60 and a nut member 61. The knob body 60 is attached to the attachment hole 2e in a rotatable state. The nut member 61 is screwed into the inner peripheral surface of the knob body 60. The knob body 60 is a closed-end tubular member. The knob body 60 includes a knob portion 60a on its rear surface. The knob portion 60a linearly protrudes from the rear surface of the knob portion 60a along a diameter direction that is perpendicular or substantially perpendicular to a diameter of the knob body 60. Further, the knob body 60 includes a female threaded portion 60b on its inner peripheral surface. The female threaded portion 60b is screwed onto the nut member 61. The knob body 60 is held by a retainer member 60c while being prevented from being detached from the attachment hole 2e. The retainer member 60c is attached to the inner surface of the attachment hole 2e.

The nut member 61 is a closed-end tubular member. The nut member 61 includes a male threaded portion 61a on its outer peripheral surface. The male threaded portion 61a is screwed into the female threaded portion 60b of the knob body 60. The nut member 61 includes interlock slits 61b on its front end. The interlock slits 61b are interlocked with the sixth drag washer 53c that is prevented from rotating with respect to the reel body 2a. Accordingly, the nut member 61 is prevented from rotating with respect to the reel body 2a. The sixth drag washer 53c is attached to the rear part of the tubular member 51. As illustrated in FIG. 4, the sixth drag washer 53c includes a first interlock piece 53d and a pair of second interlock pieces 53e. The first interlock piece 53d is interlocked with the inner surface of the reel body 2a. The second interlock pieces 53e are interlocked with the interlock slits 61b of the nut member 61, respectively. The first interlock piece 53d extends in a radial or substantially radial direction from an outer periphery of the sixth drag washer 53c. The second interlock pieces 53e extend in a rearward axial or substantially rearward axial direction. The nut member 61 contains a coil spring 62 in its inner peripheral side.

The coil spring 62 serves to regulate drag force. The coil spring 62 is disposed in a compressed state between a spring receiver washer 63 arranged in the nut member 61 and the rear surface of the sixth drag washer 53c. The spring receiver washer 63 is attached to or contacts the bottom or the front side of a rear side of the nut member 61. The rear side of the nut member 61 extends perpendicularly or substantially perpendicularly to the spool shaft 15. The rear side of the nut member 61 has a hole in its center.

The tubular member 51 forms a part of the rear drag mechanism 7 and simultaneously forms a part of the drag switch device 9. As illustrated in FIGS. 2, 3 and 4, the tubular member 51 is attached to the stepped through hole 2g formed in the plate attachment part 2h disposed in the rear part of the reel body 2a. The tubular member 51 is herein allowed to rotate but prevented from moving forward. Further, the tubular member 51 is prevented from moving backward by the fourth, fifth, and sixth drag washers 53a, 53b and 53c pressed by the coil spring 62. Therefore, the tubular member 51 is prevented from moving back and forth with respect to the reel unit 2.

As illustrated in FIG. 4, the tubular member 51 is attached to parallel-opposed chamfered portions 15b formed on the rear part 15a of the spool shaft 15. The tubular member 51 is herein axially movable and unitarily rotatable with the spool shaft 15. The tubular member 51 has an elongated hole 51a (i.e., the inner peripheral surface of the tubular member 51). The elongated hole 51a is fitted with chamfered portions 15b. The tubular member 51 further includes a first support portion 51b, a rimmed portion 51c, and a second support portion 51d. The first support portion 51b is formed on the front side of the tubular member 51. The rimmed portion 51c has diameter greater than that of the first support portion 51b. The second support portion 51d has diameter less than that of the rimmed portion 51c. The first support portion 51b has a pair of parallel chamfered portions 51e. Similarly, the second support portion 51d also has a pair of parallel chamfered portions 51e. The rimmed portion 51c makes contact with the stepped portion of the through hole 2g. Accordingly, the tubular member 51 is prevented from moving forward. A rotation member 54 is attached onto the first support portion 51b formed on the front side of the tubular member 51. The rotation member 54 is herein unitarily rotatable with the tubular member 51. The rotation member 54 forms a part of the drag switch device 9. On the other hand, the fourth drag washer 53a, the click gear 52, and the fifth drag washer 53b are attached to the second support portion 51d formed on the rear side of the tubular member 51. Among other things, the click gear 52 is coupled to the tubular member 51 while being unitarily rotatable with it.

The click gear 52 makes contact with the tip of a sound producing spring (not illustrated in the figure) that is configured to produce sound in conjunction with activation of the rear drag mechanism 7 (i.e., rotation of the spool shaft 15). Further, the click gear 52 functions as a drag washer of the rear drag mechanism 7, which is unitarily rotatable with the spool shaft 15.

The fourth drag washer 53a and the fifth drag washer 53b are both attached to the reel body 2a and the spool shaft 15 in a rotatable state. The sixth drag washer 53c is attached to the spool shaft 15 in a rotatable state. The sixth drag washer 53c is interlocked with the reel body 2a in a non-rotatable state. Further, the sixth drag washer 53c prevents the nut member 61 from rotating as described above.

Drag Switch Device Structure

As illustrated in FIGS. 2, 3 and 4, the drag switch device 9 includes a drag switch lever 68, a switch mechanism 69, and the return mechanism 70. The drag switch lever 68 (an example of an operation member) is attached to the reel unit 2. The drag switch lever 68 is pivotable between a locked position (an example of a first position) and an unlocked position (an example of a second position). The locked position is depicted by a solid line in FIG. 2, whereas the unlocked position is depicted by a dashed two-dotted line in FIG. 2. The return mechanism 70 is configured to return the switch lever 68 to the locked position from the unlocked position.

The switch mechanism 69 is configured to activate the front drag mechanism 8 when the drag switch lever 68 is set to be in the locked position. On the other hand, the switch mechanism 69 is configured to deactivate the front drag mechanism 8 when the drag switch lever 68 is set to be in the unlocked position. In the first exemplary embodiment, the switch mechanism 69 is configured to deactivate the rear drag mechanism 7 when the drag switch lever 68 is set to be in the locked position. On the other hand, the switch mechanism 69 is configured to activate the rear drag mechanism 7 when the drag switch lever 68 is set to be in the unlocked position. The switch mechanism 69 includes a lock member 72 and an extension coil spring 81 (an example of a second urging member). The lock member 72 is configured to move up and down in conjunction with movement of the tubular member 51, the rotation member 54, and the drag switch lever 68.

As illustrated in FIGS. 2, 3 and 4, the rotation member 54 is a disc plate member. In the first exemplary embodiment, the rotation member 54 is attached onto the outer peripheral surface of the tubular member 51 while being unitarily rotatable with the tubular member 51. Under this condition, the rotation member 54 is allowed to rotate unitarily with the spool shaft 15 but prevented from moving back and forth with respect to the reel unit 2. The rotation member 54 is configured to lock and to unlock the spool shaft 15 through the tubular member 51 for respectively preventing and allowing rotation of the spool shaft 15. The rotation member 54 has plural interlock portions 54a. The interlock portions 54a are circumferentially separated from each other, and extend in a radial direction from an outer periphery of the rotation member 54. The interlock portions 54a are recessed from the outer peripheral surface of the rotation member 54. Further, the rotation member 54 includes an elongated hole 54b (i.e., an inner peripheral surface). The elongated hole 54b is fitted onto the chamfered portions 51e of the first support portion 51b of the tubular member 51 while being unitarily rotatable with the tubular member 51. The rotation member 54 is an interlock/non-interlock target with which of from which the lock member 72 is interlocked or separated. Specifically, when the lock member 72 is interlocked with the rotation member 54, the rotation member 54 is locked and thereby prevented from rotating. On the other hand, when the lock member 72 is separated from the rotation member 54, the rotation member 54 is unlocked and thereby allowed to rotate.

As illustrated in FIGS. 2, 3, and 4, the drag switch lever 68 is urged between the locked position and the unlocked position by means of a toggle spring 73. The drag switch lever 68 is attached to the upper rear part of the reel unit 2. The drag switch lever 68 is pivotable about a first axis X1 perpendicular to the spool shaft 15. Specifically, the drag switch lever 68 is pivotable between the locked position depicted by the solid line in FIG. 2 and the unlocked position depicted by the dashed two-dotted line in FIG. 2. The first axis X1 is positioned behind and in parallel to the face gear shaft 11a. Simultaneously, the first axis X1 is positioned closer to the fishing rod attachment 2c than the face gear shaft 11a is. As illustrated in FIG. 3, the drag switch lever 68 includes a shaft part 76, an operation part 77, and a second arm 78. The shaft part 76 is disposed in the upper rear part of the reel unit 2 along the first axis X1. The operation part 77 holds the both ends of the shaft part 76 while being unitarily pivotable with the shaft part 76. The second arm 78 is integrally formed with the shaft part 76. The second arm 78 is therefore unitarily movable with the shaft part 76. As illustrated in FIG. 2, the second arm 78 is configured to press the lock member 72 towards the separate position from the interlock position.

As illustrated in FIGS. 3 and 4, the shaft part 76 includes a large diameter portion 76a, a first small diameter portion 76b, and a second small diameter portion 76c. The large diameter portion 76a is integrally formed with the second arm 78 and a spring holding arm 79. The first small diameter portion 76b and the second small diameter portion 76c are formed on opposite sides of the large diameter portion 76a. The second arm 78 presses down the lock member 72 that locks and unlocks the rotation member 54. The spring holding arm 79 holds a first end of the toggle spring 73. The spring holding arm 79 forwardly protrudes from the large diameter portion 76b. On the other hand, the second arm 78 backwardly or rearwardly protrudes from the large diameter portion 76. In other words, the second arm 78 is formed on a side opposite that of the spring holding arm 79. The large diameter portion 76a has a regulation protrusion 76d. Specifically, the regulation protrusion 76d protrudes from a part of the outer peripheral surface of the large diameter portion 76a (i.e., a part adjacent to the first small diameter portion 76b) to a position where the regulation protrusion 76d overlaps with the outer peripheral surface of the first small diameter portion 76b. The regulation protrusion 76d is configured to cause a first arm 82 (described below) to pivot in conjunction with the drag switch lever 68 when the drag switch lever 68 is pivoted to the unlocked position from the locked position.

The first small diameter portion 76b is the right-side small diameter portion of the shaft part 76, as illustrated in FIG. 3. The first small diameter portion 76b includes a pair of first chamfered portions 76e on its front end. The first chamfered portions 76e are formed in parallel to each other for allowing the operation part 77 to pivot unitarily with the shaft part 76. The first small diameter portion 76b is a stepped shaft provided with large and small diameter steps. The first arm 82 is attached onto the small diameter step in a rotatable state. On the other hand, a twisted coil spring 80 is disposed onto the outer peripheral surface of the large diameter step of the first small diameter portion 76b. A first end of the twisted coil spring 80 is held by the regulation protrusion 76d whereas a second end thereof is held by the first arm 82.

The second small diameter portion 76c is a left-side small diameter portion of the shaft part 76, as illustrated in FIG. 3. The second small diameter portion 76c includes a pair of second chamfered portions 76f on its front end. The second chamfered portions 76e are formed in parallel to each other to allow the operation part 77 to pivot unitarily with the shaft part 76.

As illustrated in FIG. 4, the operation part 77 includes a first lever portion 77a, a second lever portion 77b, and a coupler member 77c. The coupler member 77c couples the first lever portion 77a and the second lever portion 77b. The first lever portion 77a is coupled to a part of the first small diameter portion 76 (including the first chamfered portions 76e) while being unitarily pivotable with the shaft part 76. The second lever portion 77b is coupled to a part of the second small diameter portion 76c (including the second chamfered portions 76f) while being unitarily pivotable with shaft part 76.

As illustrated in FIG. 3, the lock member 72 is configured to move up and down between the interlock position and the separate position. In the interlock position, the lock member 72 is interlocked with the rotation member 54 to prevent it from rotating. In the separate position, on the other hand, the lock member 72 is separated from the rotation member 54 to allow it to rotate. The interlock position is depicted by a solid line in FIG. 3 whereas the separate position is depicted by a dashed two-dotted line in FIG. 3. The lock member 72 is a roughly L-shaped plate member. The lock member 72 is composed of a vertical side 72a and a horizontal side 72b. The lock member 72 is guided by the reel body 2a while being movable up and down. The horizontal side 72b of the lock member 72 has an upwardly-protruding interlock protrusion 72c. The interlock protrusion 72c extends from an inner surface of the lock member 72 in a direction perpendicular or substantially perpendicular to the first axis X1. The interlock protrusion 72c is interlocked with any one of the interlock portions 54a of the rotation member 54 in the interlock position.

A first end of the extension coil spring 81 is held by the reel body 2a. The extension coil spring 81 urges the lock member 72 towards the interlock position.

As illustrated in FIG. 3, when the drag switch lever 68 is pivoted to the unlocked position from the locked position, the lock member 72 is pressed by the second arm 78 and accordingly moves downward. The interlock protrusion 72c is thus separated from the interlock portions 54a to the separate position. The rotation member 54 is thereby allowed to rotate. Further, the spool shaft 15 is allowed to rotate through the tubular member 51. Consequently, the front drag mechanism 8 is set to be in the deactivation state whereas the rear drag mechanism 7 is set to be in the activation state.

When the drag switch lever 68 is pivoted to the locked position from the unlocked position, the lock member 72 is released from the pressure of the second arm 78 and urged upward by the extension coil spring 81. Accordingly, the interlock protrusion 72c is interlocked with any one of the interlock portions 54a. The rotation member 54 is thereby prevented from rotating. Further, the spool shaft 15 is prevented from rotating through the tubular member 51. Consequently, the front drag mechanism 8 is set to be in the activation state while the rear drag mechanism 7 can be set in the deactivation state.

As illustrated in FIG. 2, the first end of the toggle spring 73 is held by the spring holding arm 79 whereas a second end thereof is held by the reel body 2a. The toggle spring 73 urges the drag switch lever 68 between the locked position and the unlocked position based on the dead center (hereinafter referred to as a threshold position) where the first end of the toggle spring 73 passes through an imaginary line connecting the first axis X1 and the second end of the toggle spring 73.

Referring to FIGS. 2 and 3, under the condition where the drag switch lever 68 is urged by the toggle spring 73, the drag switch lever 68 is set to be in the unlocked position while the operation part 77 makes contact or almost makes contact with a first part of the outer surface of the reel body 2a, whereas the drag switch lever 68 is set to be in the locked position while the coupler member 77c of the operation part 77, disposed across the reel body 2a and the lid member 2b, makes contact or almost makes contact with a second part of the outer surface of the reel body 2a and the outer surface of the upper part of the lid member 2b farther upward and forward of the first part of the outer surface of the reel body 2a.

Return Mechanism Structure

The return mechanism 70 is configured to return the drag switch lever 68 to the locked position from the unlocked position in conjunction with rotation of the handle 1 in the fishing line winding direction. As illustrated in FIGS. 2 to 5, the return mechanism 70 includes the first arm 82 attached to the drag switch lever 68, the cam gear 20, the press member 83 attached to the cam gear 20, and a press spring 84 (an example of a first urging member). The press spring 84 is configured to press the press member 83. For example, the press spring 84 is a coil spring disposed in a bent state.

As illustrated in FIGS. 2 to 4, the first arm 82 is a plate-shaped arm member attached onto the first small diameter portion 76b of the shaft part 76 in a rotatable state. The first arm 82 protrudes from the shaft part 76 in a radial direction while being attached to it. The first arm 82 is urged by the twisted coil spring 80 in the counter-clockwise direction in FIG. 2. The first arm 82 normally makes contact with the regulation protrusion 76d (i.e., the first arm 82 is set to be in a regulation posture) while being urged by the twisted coil spring 80. The twisted coil spring 80 is configured to allow the first arm 82 to maintain the regulation posture when the drag switch lever 68 is pivoted to the locked position from the unlocked position. Further, the twisted coil spring 80 is configured to cause the first arm 82 to pivot in conjunction with the drag switch lever 68. When the drag switch lever 68 pivots between the locked position and the unlocked position, the first arm 82 pivots between the locked position and the unlocked position in conjunction with the shaft part 76 by the action of the regulation protrusion 76d and the twisted coil spring 80. When the drag switch lever 68 is manually pivoted to the locked position from the unlocked position, the first arm 82 is configured to rotate in a direction away from the regulation protrusion 76d in order to set the drag switch lever 68 to be in the locked position even if the tip of the first arm 82 makes contact with the press member 83 described below.

Figure 5:
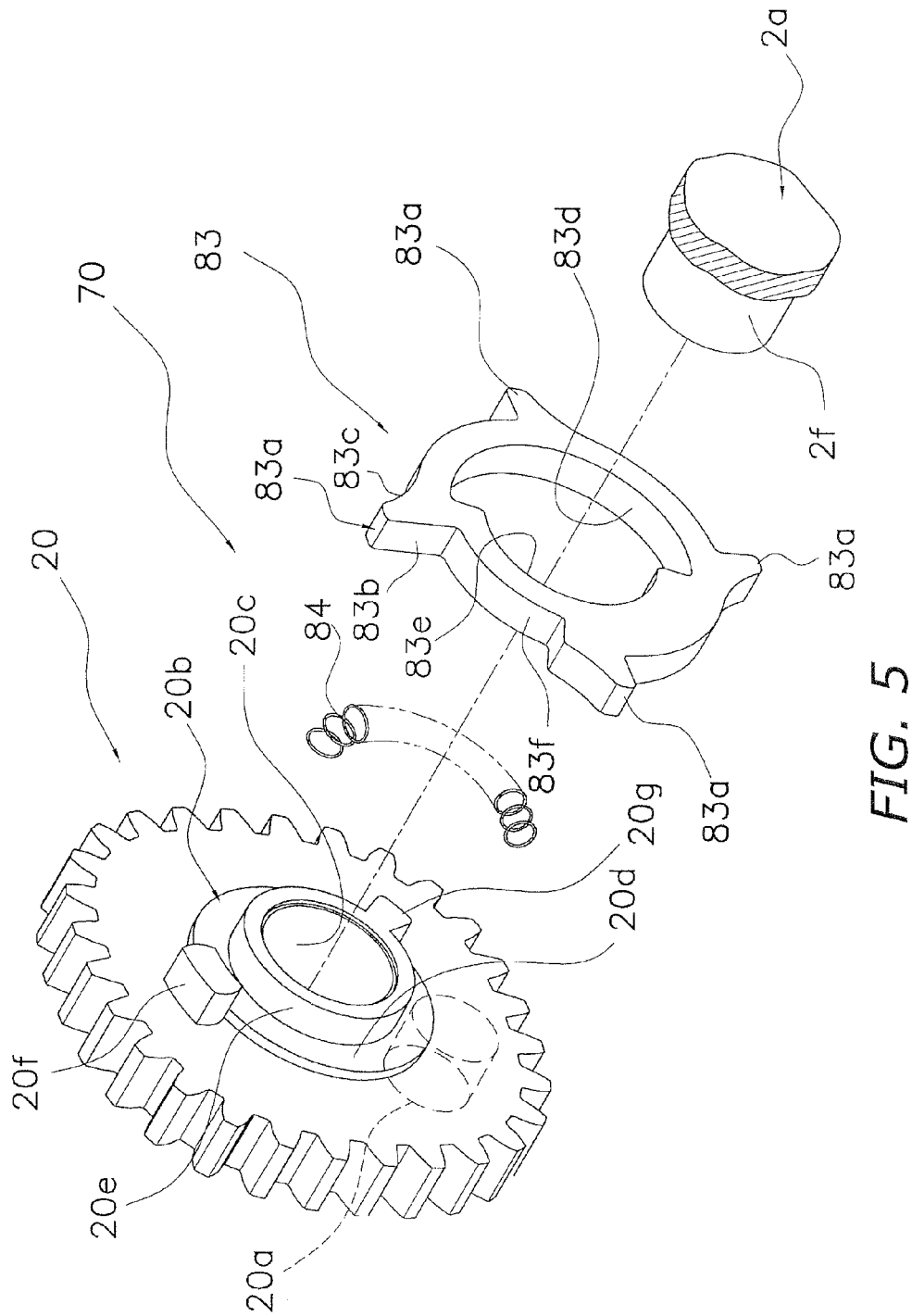
FIG. 5 is an exploded perspective view of a return mechanism of the drag switch device.

As illustrated in FIG. 5, the cam gear 20 includes the member attachment portion 20b on its second side (i.e., a side opposed to the illustrated side in FIG. 2). The press member 83 is attached to the member attachment portion 20b. Further, the cam gear 20 includes a support hole 20c in its center part. The cam gear 20c is supported by the gear shaft 2f through the support hole 20c. The member attachment portion 20b includes a base surface 20d, a support tubular portion 20e, a positioning protrusion 20f, and a spring holding protrusion 20g. The base surface 20d is a circular portion where the press member 83 is attached and axially extends from the second side. The support tubular portion 20e includes the support hole 20c. The positioning protrusion 20f is formed on the outer peripheral surface of the base surface 20d while protruding from the second side in parallel to the second axis X2. The spring holding protrusion 20g protrudes from the outer peripheral surface of the support tubular portion 20e in a radial direction. Both the support tubular portion 20e and the spring holding protrusion 20g extend from the base surface 20d in an axial direction.

The press member 83 is a plate-shaped member attached to the member attachment portion 20b while being rotatable in a predetermined angle range. The press member 83 includes plural (e.g., four) press protrusions 83a on its outer periphery. The press protrusions 83a are circumferentially separated from each other. Each of the press protrusions 83a is formed in a blade shape and composed of a flat surface 83b and a curved surface 83c. Each flat surface 83b is formed in a radial direction. Each curved surface 83c extends towards an adjacent press protrusion 83a. The press member 83 includes a spring housing 83d and a support recess 83e on its inner periphery. The spring housing 83d is formed in a roughly semicircular shape and has a large diameter. The spring housing 83d contains the press spring 84 while the press spring 84 is radially interposed between the spring housing 83d and the outer peripheral surface of the support tubular portion 20e, and axially interposed between the base surface 20d and the reel body 2a. On the other hand, the support recess 83e is formed in a roughly semicircular shape and has a small diameter relative to the spring housing 83d. The support recess 83e is supported by the support tubular portion 20e. Further, the spring housing 83d contains the spring holding protrusion 20g of the member attachment portion 20b. The foregoing press spring 84 is disposed in a compressed state between the spring holding protrusion 20g and one of circumferential end walls of the spring housing 83d. The press member 83 is thereby urged in the counter-clockwise direction in FIG. 2. The outer peripheral surface of the spring holding protrusion 20g makes contact with the inner peripheral surface of the spring housing 83d. The press member 83 is supported by the cam gear 20 through the contact between the semicircular support recess 83e and the support tubular portion 20e and the contact between the spring holding protrusion 20g and the spring housing 83d. The press member 83 is herein rotatable within a predetermined range of rotation.

The press member 83 further includes a positioning recess 83f for receiving the positioning protrusion 20f. The positioning recess 83f is formed on the side opposite that of the support recess 83e, which is a part of the outer periphery of the press member 83 between two press protrusions 83a. When the positioning protrusion 20f is disposed along the positioning recess 83f, the press member 83 is restricted to rotate in a predetermined angle range.

Operation and Action of Reel

Referring initially to FIGS. 1, 2, 3, and 4, prior to casting, the switch lever 67 is operated for causing the anti-reverse mechanism 66 to prevent the rotor 3 from reversely rotating. The bail arm 33 is inverted to the fishing line release posture while being held by the hand of an angler. The drag switch lever 68 is then pivoted to the unlocked position (see the dashed two-dotted line in FIG. 2) from the locked position (see the solid line in FIG. 2).

When the drag switch lever 68 is pivoted to the unlocked position, the lock member 72 is pressed by the second arm 78 and moved down to the separate position. When the first end of the toggle spring 73 is positioned higher than the threshold position, the drag switch lever 68 is urged towards the unlocked position and finally held in the unlocked position. Further, the second arm 78, integrally formed with the drag switch lever 68, is held in the unlocked position and the lock member 72 is accordingly held in the separate position. The rotation member 54 is thereby allowed to rotate, and the front drag mechanism 8 is set to be in the deactivation state and the rear drag mechanism 7 is set to be in the activation state. Consequently, a small drag force is applied to the spool 4. In the return mechanism 70, on the other hand, the tip of the first arm 82 is located in the vicinity of a predetermined press protrusion 83a of the press member 83 in response to the pivot of the first arm 82.

Figure 6:
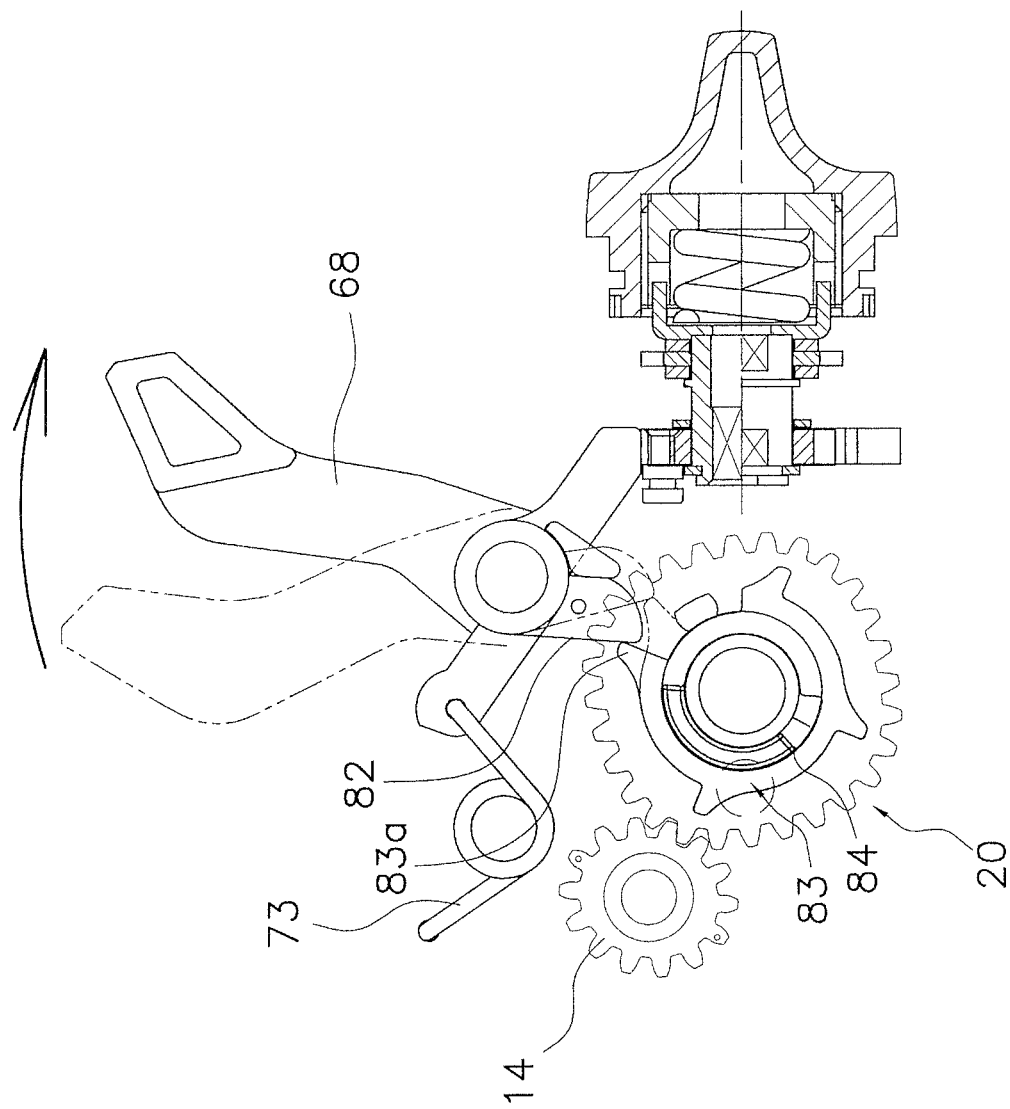
FIG. 6 is a side view of the return mechanism illustrating a contact avoidance action of the return mechanism.

While the drag switch lever 68 is pivoted to the locked position from the unlocked position, the tip of the first arm 82 possibly makes contact with the predetermined press protrusion 83a depending on a position where the press member 83 stops. In this case, the face gear shaft 11a is prevented from rotating in the fishing line release direction by the anti-reverse mechanism 66. The cam gear 20 is thereby prevented from rotating in the fishing line release direction (i.e., the counter-clockwise direction in FIG. 2). However, the press member 83 is allowed to rotate in the counter-clockwise direction when receiving a greater force than the pressure of the press spring 84. In other words, the press member 83 rotates in the counter-clockwise direction when being pressed by the first arm 82. FIG. 6 illustrates this condition. In FIG. 6, when the drag switch lever 68 is pivoted rearward to the unlocked position from the locked position, the drag switch lever 68 can be set to be in the unlocked position even if the first arm 82 makes contact with the press member 83.

Drag force of the rear drag mechanism 7 is, for instance, regulated depending on conditions in a fishing site (e.g., wind and water flow). For example, when the rear drag knob 50 is rotated in the clockwise direction, compression force of the coil spring 62 is increased and drag force is accordingly increased. In other words, when the rear drag knob 50 is rotated in the clockwise direction, the nut member 61 is moved to the leftward in FIG. 2 and compresses the coil spring 62. When the coil spring 62 is compressed, pressure is increased on the fourth drag washer 53a and the fifth drag washer 53b. Accordingly, the click gear 52, configured to rotate unitarily with the spool shaft 15, is braked with a large force. Consequently, drag force is increased for braking the spool shaft 15 through the tubular member 51. On the other hand, when the rear drag knob 50 is rotated in the counter-clockwise direction, drag force is reduced.

Casting can be done after the aforementioned operation is completed. After casting, the bail arm 33 is returned to the fishing line winding posture with, e.g., the hand of an angler. Then the angler waits for fish to bite the bait. When fish gets caught in the tackle, the spool 4 reversely rotates. The drag switch lever 68 is set to be in the unlocked position under this condition. Therefore, the click gear 52 rotates together with the spool shaft 15 and accordingly produces sound.

Figure 7:
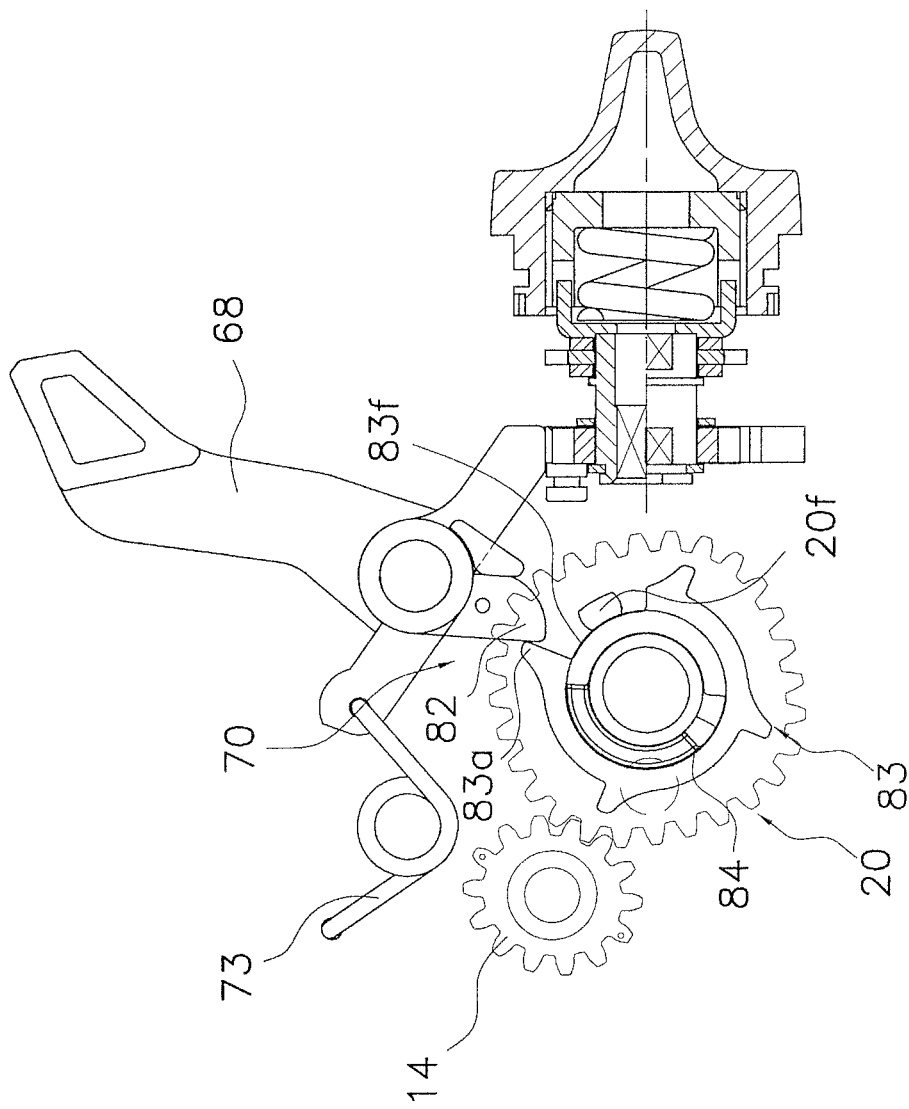
FIG. 7 is a side view of the return mechanism illustrating a return action of the return mechanism.
Figure 8:
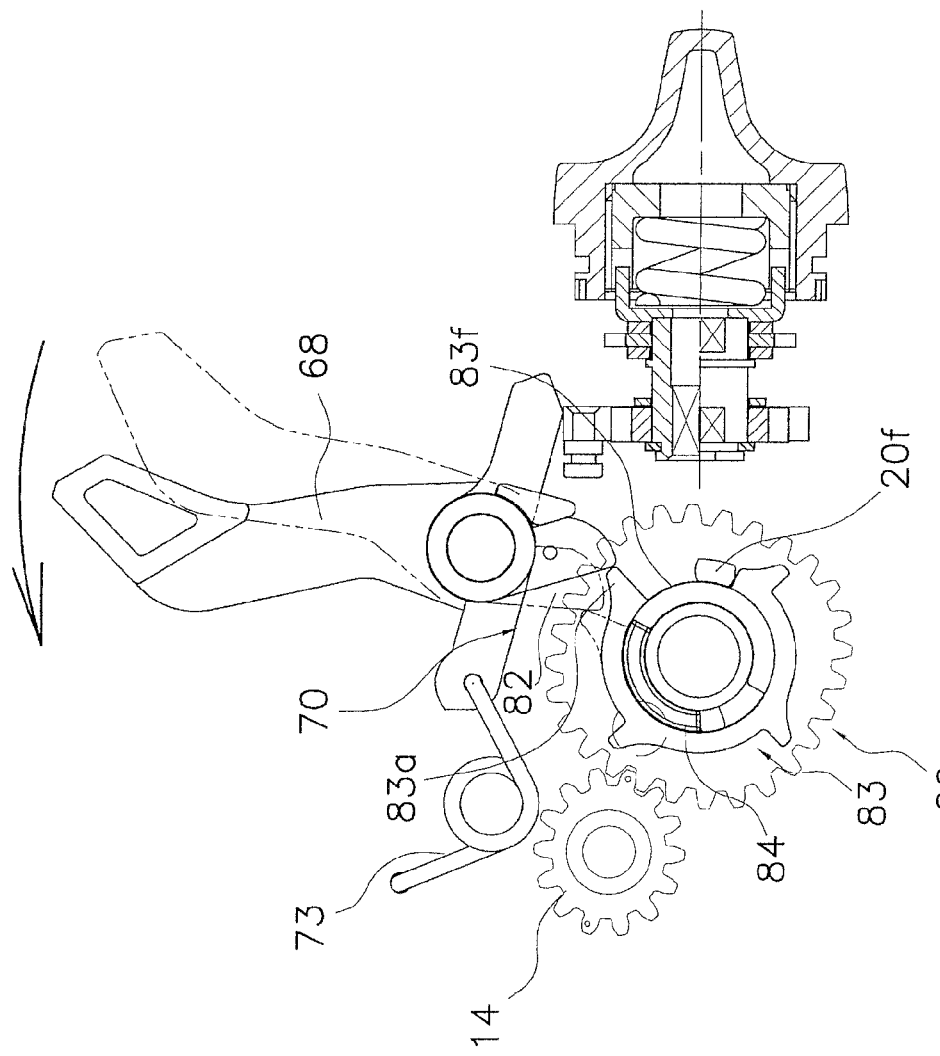
FIG. 8 is a side view of the return mechanism further illustrating the return action of the return mechanism.

Now, the handle 1 is rotated in the fishing line winding direction to confirm that a fish is caught on the hook and/or to allow the fish further to become firmly caught on the hook. Accordingly, the press member 83 presses the first arm 82, and the drag switch lever 68 is pressed to the locked position from the unlocked position. When the first end of the toggle spring 73 is positioned lower than the threshold position, the drag switch lever 68 is held in the locked position. FIGS. 7 and 8 illustrate this condition. When the handle 1 is rotated in the fishing line winding direction, the driving gear 14 rotates in the fishing line winding direction (i.e., counter-clockwise direction in FIG. 7). Accordingly, the cam gear 20, meshing with the driving gear 14, rotates in the clockwise direction in FIG. 7. As illustrated in FIG. 7, the predetermined press protrusion 83a of the press member 83 makes contact with the tip of the first arm 82 that is pivoted forward in the unlocked position. When the predetermined press protrusion 83a makes contact with the tip of the first arm 82, the press spring 84 is compressed and only the cam gear 20 rotates. The positioning protrusion 20f subsequently makes contact with the upstream wall of the positioning recess 83f in the rotational direction. The positioning protrusion 20f thus directly presses the press member 83. When the predetermined press protrusion 83a presses the first arm 82 as illustrated in FIG. 8, the drag switch lever 68 is pivoted in the counter-clockwise direction in FIG. 8. When the first end of the toggle spring 73 is positioned lower than the threshold position, the drag switch lever 68 is held in the locked position by means of urging force of the toggle spring 73.

When the drag switch lever 68 is held in the locked position, the lock member 72 is interlocked with the rotation member 54 and the spool shaft 15 is prevented from rotating through the tubular member 51. Accordingly, the rear drag mechanism 7 is set to be in the deactivation state whereas the front drag mechanism 8 is set to be in the activation state. Consequently, a large drag force is applied to the spool 4.

Other Exemplary Embodiments

Other embodiments will now be explained. In view of the similarity between the first and other embodiments, the parts of the other embodiments that are identical to the parts of the first embodiment will be given the same reference numerals as the parts of the first embodiment. Moreover, the descriptions of the parts of the other embodiments that are identical to the parts of the first embodiment may be omitted for the sake of brevity.

Second Embodiment

The first exemplary embodiment has exemplified the drag switch device 9 that is configured to activate and to deactivate the front drag mechanism 8 and the rear drag mechanism 7. In the following second exemplary embodiment, however, a drag switch device 109 is configured to activate and to deactivate an intermediate drag mechanism 108 (an example of the first drag mechanism) and to activate constantly a rear drag mechanism 107, as illustrated in FIGS. 9 and 10.

Figure 9:
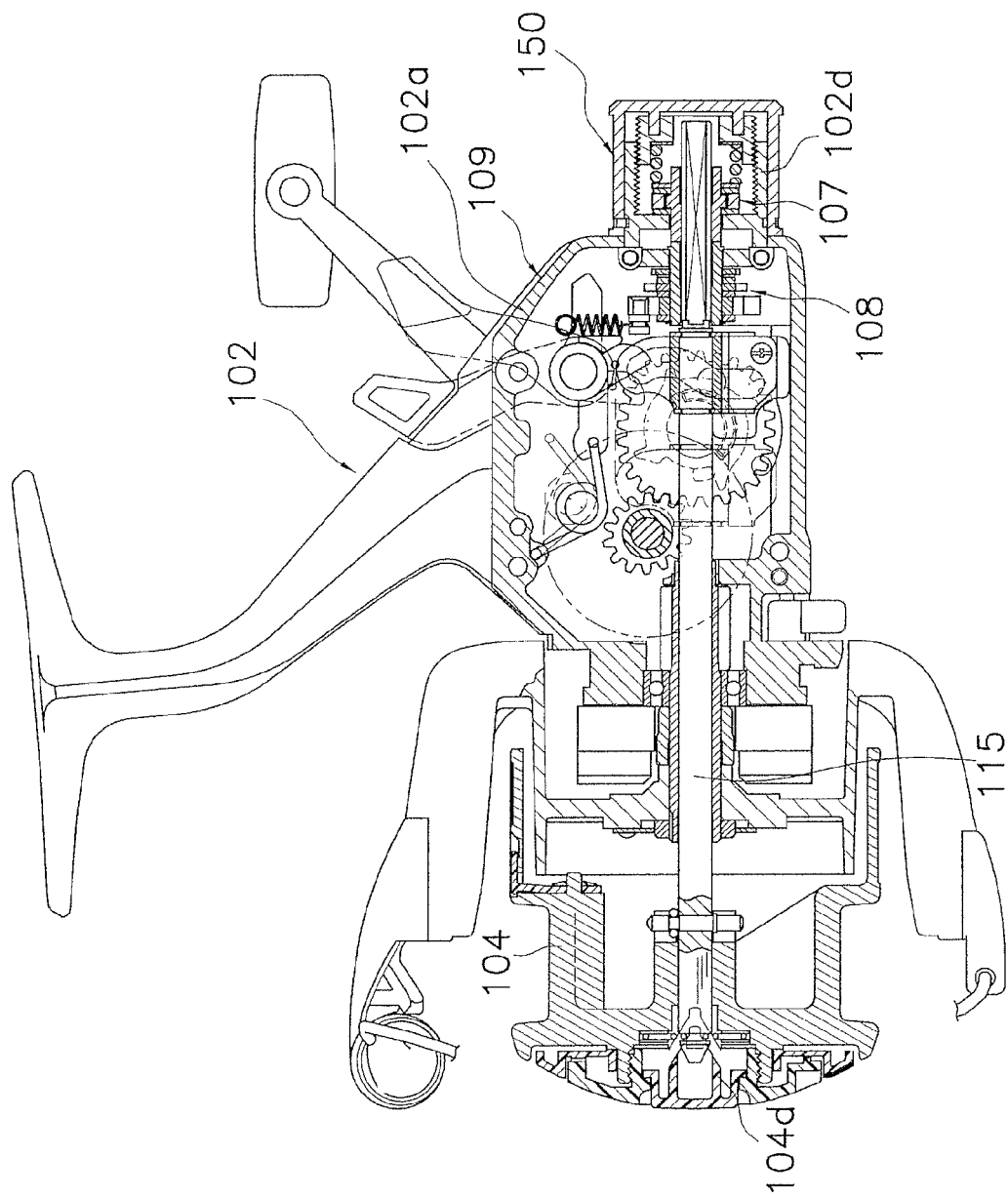
FIG. 9 is a cross-sectional side view of a part of a spinning reel corresponding to FIG. 1 according a second exemplary embodiment.
Figure 10:
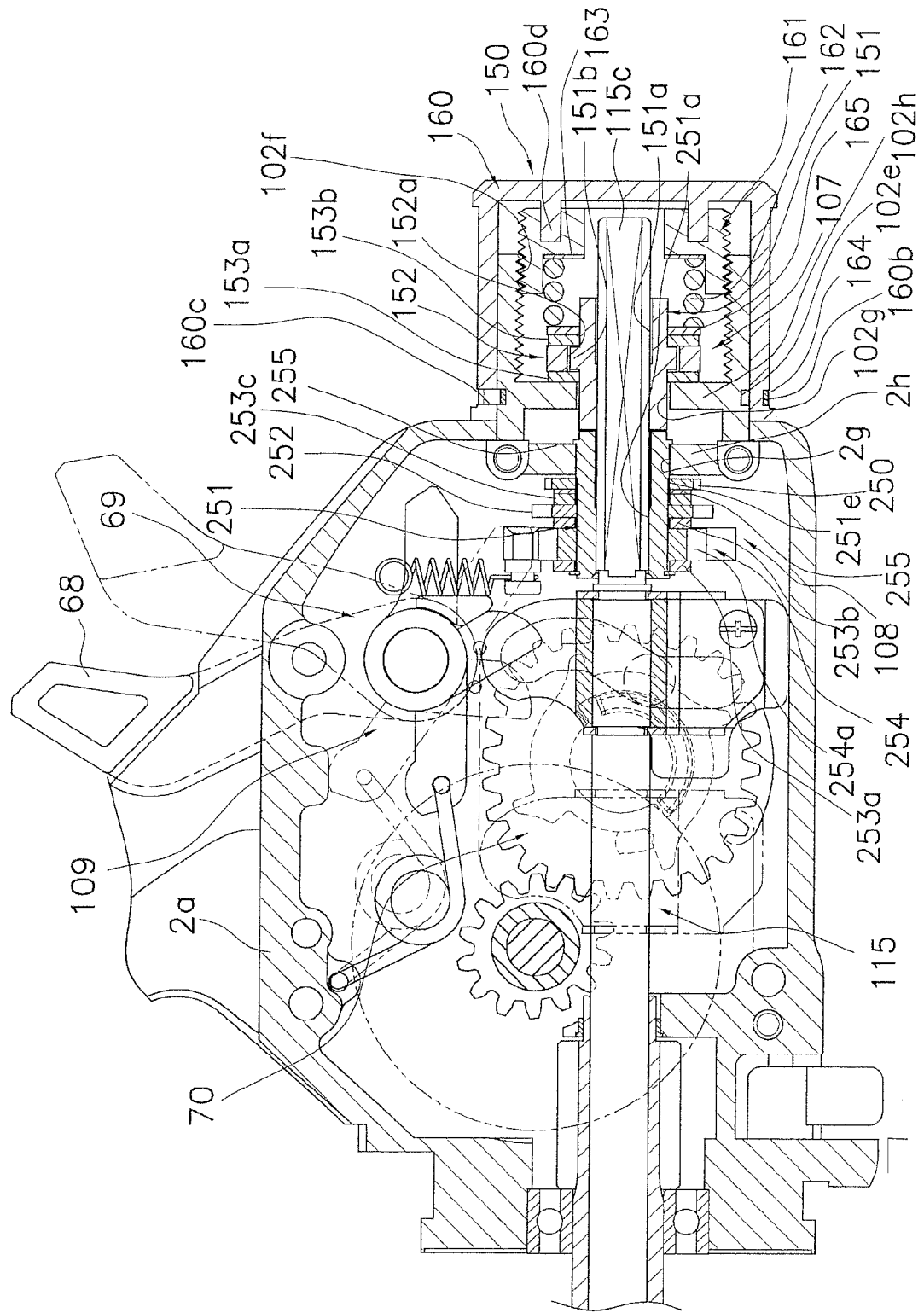
FIG. 10 is a cross-sectional side view of the rear part of a reel unit of the spinning reel corresponding to FIG. 2 according to the second exemplary embodiment.

A spinning reel, illustrated in FIG. 9, has basically the same structure as that of the first exemplary embodiment excluding an attachment structure of a rear drag knob 150, a spool 104, the rear drag mechanism 107, and the intermediate drag mechanism 108. The overlapping structure will be hereinafter omitted for brevity of explanation.

A reel unit 102 includes a screw tubular part 102d. The screw tubular part 102d is fixed to the rear part of a reel body 102a with screws.

The spool 104 includes a single-touch attachment/detachment mechanism 104d. The single-touch attachment/detachment mechanism 104 is configured to be attached to or detached from a spool shaft 115 in a single-touch operation. The spool 104 is attached to the spool shaft 115 while being unitarily rotatable with it. Further, the intermediate drag mechanism 108 and the rear drag mechanism 107 are sequentially attached onto the rear end of the spool shaft 115. In the second exemplary embodiment, the intermediate drag mechanism 108 is disposed in front of the rear drag mechanism 107.

Rear Drag Mechanism Structure

As illustrated in FIG. 10, the rear drag mechanism 107 is attached onto the rear end of the spool shaft 115. The rear drag mechanism 107 includes the rear drag knob 150, a first tubular member 151, a first drag washer 152, and a pair of second drag washers 153a and 153b. The rear drag knob 150 is screwed into the reel unit 2. The rear drag knob 150 serves to regulate drag force. The first tubular member 151 is attached to the rear part of the spool shaft 115 while being axially movable and unitarily rotatable with the spool shaft 115. The first drag washer 152 is attached to the outer peripheral surface of the first tubular member 151 while being unitarily rotatable with the first tubular member 151. The second drag washers 153a and 153b make contact with the both sides of the first drag washer 152.

The rear drag knob 150 is attached to the tubular-shaped screw tubular part 102d in a rotatable state. The rear drag knob 150 includes a knob body 160 and a nut member 161. The knob body 160 is attached to the screw tubular part 102d in a rotatable state. The nut member 161 is attached to the knob body 160 while being axially movable and unitarily rotatable with it. Further, a coil spring 162 is attached in a compressed state between the nut member 161 and the second drag washer 153b. The knob body 160 is a closed-end member. The knob body 160 has a spring attachment groove 160b on its outer peripheral surface. The spring attachment groove 160b is an annular groove for preventing the knob body 160 from being detached from the screw tubular part 102d.

The spring attachment groove 160b has two through holes 160c (see FIG. 10) in its circumferential direction. The through holes 160c pass through the knob body 160. Further, the knob body 160 has plural (e.g., three) interlock protrusions 160d on the inner surface of its bottom, i.e., the inner side of a rear portion. The interlock protrusions 160d are interlocked with the nut member 161. The nut member 161 is thereby allowed to move axially and to rotate unitarily with the knob body 160. The interlock protrusions 160d are protruded to the leftward in FIG. 10 in a circular-arc shape. In other words, the interlock protrusions 160d extend from the inner side of the rear portion or bottom of the knob body 160 toward the front. The screw tubular part 102d has an annular retainer groove 102e on its outer peripheral surface. The retainer groove 102e is concentric to the spring attachment groove 160b with respect to the spool shaft 115. A retainer spring 164 is attached to the spring attachment groove 160b. The retainer spring 164 is formed by curving an elastic plate in a C-shape. The retainer spring 164 has a convex portion protruding from its center part in a radial inward direction. The knob body 160 is thereby prevented from being detached from the screw tubular part 102d. Further, when the rear drag knob 150 is handled, the convex portion of the retainer spring 164 repeatedly hits the rear drag knob 150 and accordingly produces sound.

The nut member 161 is formed in a roughly columnar shape. The nut member 161 is screwed into a female threaded portion 102f formed on the inner peripheral surface of the screw tubular part 102d. The nut member 161 is interlocked with the interlock protrusions 160d. The nut member 161 contains the coil spring 162 in its inner housing part. The coil spring 162 serves to regulate drag force. The coil spring 162 is disposed on the outer peripheral side of the rear end of the spool shaft 115. The coil spring 162 is disposed in a compressed state between the nut member 161 and the second drag washer 153b. One end of the coil spring 162 makes contact with the second drag washer 153b through a washer 165, whereas the other end thereof makes contact with the nut member 161 through a spring receiver washer 163.

The first tubular member 151 is attached to a through hole 102g formed in a plate-shaped attachment portion 102h of the screw tubular part 102d. The first tubular member 151 is herein allowed to rotate but prevented from moving forward through the second drag washer 153a. Further, the first tubular member 151 is prevented from moving backward by way of the coil spring 162. Thus, the first tubular member 151 is prevented from axially moving with respect to the reel unit 102.

The first tubular member 151 is attached to a pair of parallel-opposed chamfered portions 115c formed on the rear end of the rear end of the spool shaft 115 while being axially movable and unitarily rotatable with the spool shat 115. The first tubular member 151 has an elongated hole 151a (i.e., the inner peripheral surface of the first tubular member 151). The elongated hole 151a is fitted with the chamfered portions 115c. Further, the first tubular member 151 has four protrusions 151b on the axial center part of its outer periphery. The protrusions 151b are circumferentially separated from each other while being protruded in a radial outward direction. Next, the first drag washer 152 has four recesses 152a on its inner peripheral surface. The recesses 152a are interlocked with the protrusions 151b. The first drag washer 152 is thus configured to rotate unitarily with the first tubular member 151. On the other hand, the second drag washers 153a and 153b have an interlock protrusion (not illustrated in the figure), respectively. The interlock protrusions are interlocked with the screw tubular part 102d. The second drag washers 153a and 153b are thereby prevented from rotating with respect to the screw tubular part 102d.

With the foregoing structure, the rear drag mechanism 107 is configured to apply constantly drag force to the spool 104 and simultaneously to regulate drag force by rotating the rear drag knob 150.

Intermediate Drag Mechanism Structure

The intermediate drag mechanism 108 is disposed in front of the rear drag mechanism 107. The intermediate drag mechanism 108 has basically the same structure as that of the rear drag mechanism 7 of the first exemplary embodiment. However, the intermediate drag mechanism 108 is different from the rear drag mechanism 7 in that a rotation member 254 is rotatable with respect to a second tubular member 251.

The intermediate drag mechanism 108 includes the second tubular member 251, an intermediate drag regulation nut 250, a click gear 252, a third drag washer 253a, a fourth drag washer 253b, and a fifth drag washer 253c. The second tubular member 251 is attached to the spool shaft 115 while being axially movable and unitarily rotatable with it. The second tubular member 251 is disposed in front of the first tubular member 151. The intermediate drag regulation nut 250 is screwed onto the outer peripheral surface of the second tubular member 251. The click gear 252 is attached to the outer peripheral surface of the second tubular member 251 in a rotatable state. The third drag washer 253a and the fourth drag washer 253b make contact with the both sides of the rotation member 254. The fifth drag washer 253c is disposed between the click gear 252 and the intermediate drag regulation nut 250. The intermediate drag regulation nut 250 is configured to press the fifth drag washer 253c through a disc spring 255. Drag force of the intermediate drag mechanism 108 can be regulated with the foregoing structure.

The second tubular member 251 forms a part of the intermediate drag mechanism 108. Simultaneously, the second tubular member 251 forms a part of the drag switch device 109. The second tubular member 251 is different from the tubular member 51 of the first exemplary embodiment in that the second tubular member 251 has a male threaded portion 251e to be screwed into the intermediate drag regulation nut 250. The second tubular member 251 is attached to a stepped through hole 2g formed in a plate-shaped attachment part 2h disposed in the rear part of the reel body 2a. The second tubular member 251 is herein allowed to rotate but prevented from moving forward. As is the case with the tubular member 51, the second tubular member 251 is further attached to the chamfered portions 115c formed on the rear end of the spool shaft 115 while being axially movable and unitarily rotatable with the spool shaft 115. The second tubular member 251 makes contact with the front end of the first tubular member 151. It should be further noted that the spool shaft 115 is different from the spool shaft 15 of the first exemplary embodiment in the following points. The chamfered portions 115c are longer than the chamfered portions 15b. Further, the shape of the front distal end of the spool shaft 115 is different from that of the spool shaft 15. This is because the front distal end of the spools shaft 115 is formed for attaching the single-touch attachment/detachment mechanism 104d thereto. Excluding the above points, the structure of the second tubular member 251 is basically the same as that of the tubular member 51 of the first exemplary embodiment. Therefore, description of the overlapping structure will be hereinafter omitted for brevity of explanation.

The rotation member 254 is a disc member attached to the second tubular member 251 in a rotatable state. The rotation member 254 forms a part of the intermediate drag mechanism 108, and simultaneously forms a part of the drag switch device 109. The rotation member 254 has plural interlock portions 254a on its outer peripheral surface. The interlock portions 254a are circumferentially separated from each other. The interlock portions 254a are recessed from the outer peripheral surface of the rotation member 254. The shape of the interlock portions 254a is the same as that of the interlock portions 54a of the first exemplary embodiment.

The rotation member 254 is allowed to rotate or prevented from rotating by a lock member 72 of the drag switch device 109. In response to this, the intermediate drag mechanism 108 is set to be in an activation state or a deactivation state. The activation state herein corresponds to the non-rotatable state of the rotation member 254, whereas the deactivation state corresponds to the rotatable state of the rotation member 254.

The drag switch device 109 is configured to be the same as the drag switch device 9 of the first exemplary embodiment. When a drag switch lever 68 is set to be in a locked position depicted by a solid line in FIG. 10, the rotation member 254 is locked and accordingly prevented from rotating. In response to this, the intermediate drag mechanism 108 is set to be in the activation state. Consequently, the spool 104 is braked by addition of the drag force of the rear drag mechanism 107 and that of the intermediate drag mechanism 108. On the other hand, when the drag switch lever 68 is set to be in an unlocked position depicted by a dashed two-dotted line in FIG. 10, the rotation member 254 is unlocked and accordingly allowed to rotate. In response to this, the intermediate drag mechanism 108 is set to be in the deactivation state. Consequently, the spool 104 is braked by drag force of the rear drag mechanism 107.

Features of the First and/or Second Embodiments (A) The drag switch device 9 (or the drag switch device 109) is configured to activate and to deactivate the front drag mechanism 8 (or the intermediate drag mechanism 108). The front drag mechanism 8 (or the intermediate drag mechanism 108) brakes the spool 4 attached to the reel unit 2 of the spinning reel that is configured to reel out the fishing line forward and includes the handle 1 for winding the fishing line and the fishing rod attachment 2c. The drag switch device 9 (or the drag switch device 109) includes the drag switch lever 68, the switch mechanism 69, and the return mechanism 70. The drag switch lever 68 is disposed closer to the fishing rod attachment 2c than the face gear shaft 11a is. The drag switch lever 68 is also pivoted between the locked position and the unlocked position (i.e., the position where the drag switch lever 68 is pivoted from the locked position). The drag switch lever 68 is attached to the reel unit 2 while being pivotable about the first axis X1 positioned parallel to the face gear shaft 11a. Simultaneously, the drag switch lever 68 is disposed behind the face gear shaft 11a. When the drag switch lever 68 is set to be in the locked position, the switch mechanism 69 activates the front drag mechanism 8 (or the intermediate drag mechanism 108). When the drag switch lever 68 is set to be in the unlocked position, on the other hand, the switch mechanism 69 deactivates the front drag mechanism 8 (or the intermediate drag mechanism 108). The return mechanism 70 presses the first arm 82 in conjunction with rotation of the handle 1 in the fishing line winding direction for returning the drag switch lever 68 to the locked position from the unlocked position. The return mechanism 70 includes the cam gear 20, the press member 83, and the first arm 82 configured to pivot in conjunction with the drag switch lever 68. The cam gear 20 rotates about the second axis X2. The second axis X2 is positioned in parallel to the first axis X1. Further, the second axis X2 is positioned behind the face gear shaft 11a while being separated farther from the fishing rod attachment 2c than the face gear shaft 11a is. The cam gear 20 receives rotation force from the driving gear 14 configured to rotate unitarily with the face gear shaft 11a. The press member 83 is configured to press the first arm 82 while being attached to the cam gear 20. The return mechanism 70 is configured to press the first arm 82 in conjunction with rotation of the handle 1 in the fishing line winding direction for returning the drag switch lever 68 to the locked position from the unlocked position.

In the drag switch device 9 (or the drag switch device 109), the switch mechanism 69 activates the front drag mechanism 8 (or the intermediate drag mechanism 108) when the drag switch lever 68 is pivoted to the locked position from the unlocked position. On the other hand, the switch mechanism 69 deactivates the front drag mechanism 8 (or the intermediate drag mechanism 108), when the drag switch lever 68 is pivoted to the unlocked position from the locked position. Subsequently, when the handle 1 is rotated in the fishing line winding direction under the condition that the drag switch lever 68 is set to be in the unlocked position, rotation of the driving gear 14 is delivered to the cam gear 20 that is disposed behind the face gear shaft 11a and is separated farther from the fishing rod attachment 2c than the face gear shaft 11a is. When rotation of the driving gear 14 is delivered to the cam gear 20, the press member 83 is rotated in the same direction as the cam gear 20. Accordingly, the press member 83 presses the first arm 82, and the drag switch lever 68 is returned to the locked position from the unlocked position. When the drag switch lever 68 is returned to the locked position, the front drag mechanism 8 (or the intermediate drag mechanism 108) is switched to the activation state from the deactivation state.

In this case, both of the first axis X1 (i.e., the pivot center of the drag switch lever 68) and the second axis X2 (i.e., the rotation axis of the cam gear 20) are positioned behind the face gear shaft 11a. Further, the first axis X1 is positioned higher than the face gear shaft 11a whereas the second axis X2 is positioned lower than the face gear shaft 11a. Simultaneously, the first axis X1 is closer to the fishing rod attachment 2c than the second axis X2 is. The aforementioned structure allow for a long distance from the second axis X2 of the cam gear 20 to the first axis X1 of the drag switch lever 68. Therefore, it is possible to produce a structure having a long distance from the rotation center X2 of the cam gear 20 to a position where the press member 83 presses the first arm 82. Consequently, a large torque is delivered to the first arm 82 when the press member 82 is rotated in conjunction with rotation of the cam gear 20 and presses the first arm 82. In other words, even if the handle 1 is rotated with a small force, a large force is applied to the return action for returning the drag switch lever to the locked position from the unlocked position. It is thereby possible to reduce the force required for a return operation of the drag switch device as much as possible. As another advantageous effect, durability of the press member 83 and the first arm 82 will be enhanced because contact pressure can be reduced between the press member 83 and the first arm 82.

(B) In the drag switch device 9 (or the drag switch device 109), the cam gear 20 meshes with the driving gear 14 and forms a part of the oscillation mechanism 6 for moving the spool 4 back and forth. Further, the press member 83 is coupled to the cam gear 20 while being unitarily rotatable with it.

In this case, the drag switch lever 68 can be pivoted to the locked position from the unlocked position with the use of the cam gear 20 of the oscillation mechanism 6. Therefore, it is not necessary to prepare a gear member exclusively for pivoting the drag switch lever 68. In other words, structure of the return mechanism 70 will be simple. Further, the press member 83 is attached to the oscillation cam gear 20 with a relatively large diameter. Therefore, the press member 83 can be formed in a large outline. In other words, it is possible to elongate the distance from the second axis X2 to the tips of the press protrusions 83a.

(C) In the drag switch device 9 (or the drag switch device 109), the switch mechanism 69 includes the rotation member 54 (or the rotation member 254) and the lock member 72. The rotation member 54 (or the rotation member 254) is attached to the spool shaft 15 (or the spool shaft 115) and the spool 4 (or the spool 104) is attached to the distal end of the spool shaft 15 (or the spool shaft 115), while the rotation member 54 (or the rotation member 254) is allowed to rotate unitarily with the spool shaft 15 (or while being allowed to rotate with respect to the spool shaft 115) but prevented from moving back and forth with respect to the reel unit 2. The rotation member 54 (or the rotation member 254) has a plural interlock portions formed on its outer periphery at predetermined circumferential intervals. The lock member 72 is movable to the interlock position and the separate position. In the interlock position, the lock member 72 is interlocked with any one of the plural interlock portions 54a (or interlock portions 254a) for preventing rotation of the rotation member 54 (or the rotation member 254). In the separate position, the lock member 72 is separated from the interlock portion 54a (or the interlock portion 254a) for allowing rotation of the rotation member 54 (or the rotation member 254). The lock member 72 is configured to move to the interlock position (or the separate position) in conjunction with pivot of the drag switch lever 68 to the locked position (or the unlocked position).

According to the drag switch device 9 (or the drag switch device 109), when the drag switch lever 68 is pivoted to the locked position from the unlocked position, the lock member 72 is moved to the interlock position for interlocking with any one of the interlock portions 54a (or the interlock portions 254a) of the rotation member 54 (or the rotation member 254). Consequently, the rotation member 54 (or the rotation member 254) is locked and accordingly prevented from rotating by the lock member 72. When the rotation member is herein attached to the spool shaft while being unitarily rotatable with it (i.e., this refers to a relation between the rotation member 54 and the spool shaft 15), the spool shaft is prevented from rotating. Therefore, the front drag mechanism 8, configured to brake the spool 4 directly, is activated. On the other hand, when the rotation member is attached to the spool shaft in a rotatable state (i.e., this refers to a relation between the rotation member 254 and the spool shaft 115), the rotation member is prevented from rotating. Therefore, the intermediate drag mechanism 108, configured to brake the spool 4 indirectly through the spool shaft 115, is activated because the rotation member 254 is rotatable with respect to the spool shaft 115.

Again, according to the drag switch device 9 (or the drag switch device 109), when the drag switch lever 68 is pivoted to the unlocked position from the locked position, the lock member 72 is moved to the separate position and is accordingly separated from the interlock portion 54a (or the interlock portion 254a) of the rotation member 54 (or the rotation member 254). Consequently, the rotation member 54 (or the rotation member 254) is unlocked and allowed to rotate by the lock member 72. When the rotation member is herein attached to the spool shaft while being unitarily rotatable with it (i.e., this refers to the relation between the rotation member 54 and the spool shaft 15), the spool shaft is allowed to rotate. Therefore, the front drag mechanism 8, configured to brake the spool 4 directly, is deactivated. On the other hand, when the rotation member is attached to the spool shaft while being rotatable with respect to it (i.e., this refers to the relation between the rotation member 25 and the spool shaft 115), the rotation member is allowed to rotate. Therefore, the intermediate drag mechanism 108, configured to brake indirectly the spool 4 through the spool shaft 115, is deactivated because the rotation member 254 is rotatable with the spool shaft 115.

(D) In the drag switch device 9 (or the drag switch device 109), the press member 83 is coupled to the cam gear 20 while being rotatable in a predetermined angle range. The return mechanism 70 further includes the press spring 84 for urging the press member 83 in the fishing line winding direction of the cam gear 20.

In this case, the press member 83 is rotatable in a predetermined angle range with respect to the cam gear 20 while being urged by the press spring 84 in the fishing line winding direction. Therefore, even when the press member 83 is pressed by the first arm 82 in conjunction with pivoting of the drag switch lever 68 from the locked position to the unlocked position, the press member 83 can move along the first arm 82 in such a way that the press member 83 avoids press-contact with the first arm 82. Therefore, a return operation of the drag switch lever 68 will be smoothly executed without being blocked.

(E) In the drag switch device 9 (or the drag switch device 109), the cam gear 20 has the cam protrusion 20a on its first side. The cam protrusion 20a is engaged with the cam receiver part 21a formed on the slider 21 of the oscillation mechanism 6 configured to reciprocate the spool 4 (or the spool 104) back and forth in conjunction with rotation of the handle 1. The press member 83 is coupled to the second surface, opposed to the first side, of the cam gear 20.

In this case, the cam protrusion 20a is disposed on one surface of the cam gear 20 whereas the press member 83 is disposed on the other surface of the cam gear 20. Accordingly, the coupling structure of the press member 83 is simplified.

(F) In the drag switch device 9 (or the drag switch device 109), the drag switch lever 68 includes the shaft part 76, the operation part 77, and the second arm 78. First, the shaft part 76 is disposed along the first axis X1. The shaft part 76 is attached to the reel unit 2 in a rotatable state. Further, the first arm 82 is disposed onto the shaft part 76. Next, the operation part 77 is attached to the shaft part 76 while being unitarily rotatable with it. The operation part 77 extends from the shaft part 76 in a radial outward direction and the distal end thereof protrudes outward from the reel unit 2. The second arm 78 is attached to the shaft part 76 in a rotatable state. Further, the second arm 78 is configured to press the lock member 72 to the separate position from the interlock position. The switch mechanism 69 further includes the extension coil spring 81 for urging the lock member 72 to the interlock position from the separate position.

In this case, the lock member 72 is urged towards the interlock position while being pressed towards the separate position by the second arm 78. Therefore, the lock member 72 is urged by the extension coil spring 81 in conjunction with rotation of the rotation member 54 (or the rotation member 254) and meshes with any one of the interlock portions 54a (or the interlock portions 254a), even if the second arm 78 presses the lock member 72 to a position where the lock member 72 does not mesh with any one of the interlock portions 54a (or the interlock portions 254a) of the rotation member 54 (or the rotation member 254).

(G) The drag switch device 9 (or the drag switch device 109) further includes the tubular member 51 (or the tubular member 251). The tubular member 51 (or the tubular member 251) is attached to the spool shaft 15 (or the spool shaft 115) while being axially movable and unitarily rotatable with it. Simultaneously, the tubular member 51 (or the tubular member 251) is prevented from moving back and forth with respect to the reel unit 2. Further, the rotation member 54 is attached to the outer peripheral surface of the tubular member 51 while being unitarily rotatable with it. On the other hand, the rotation member 254 is attached to the outer peripheral surface of the tubular member 251 in a rotatable state.

In this case, the rotation member 54 (or the rotation member 254) is attached to the tubular member 51 (or the tubular member 251), and the tubular member 51 (or the tubular member 251) is attached to the spool shaft 15 (or the spool shaft 115) while being allowed to rotate unitarily with the spool shaft 15 (or the spool shaft 115) but prevented from moving back and forth with respect to the reel unit 2. Therefore, the foregoing structure enables the drag mechanism, which includes the rotation member 54 (or the rotation member 254) as a component thereof, to be simple by attaching drag washers to the tubular member 51 (or the tubular member 251).

(H) The spinning reel further includes the rear drag mechanism 7 for braking the spool. Further, the rotation member 54 is disposed in the drag switch device 9 while being unitarily rotatable with the spool shaft 15. The rear drag mechanism 7 is set to be in the activation state when the lock member 72 is separated from the interlock portion 54a of the rotation member 54 and the rotation member 54 is accordingly unlocked.

In this case, the rotation member 54 is unitarily rotatable with the spool shaft 15. Therefore, the spool shaft 15, together with the rotation member 54, is rotatable with respect to the reel unit 2 in the unlocked state. Accordingly, the rear drag mechanism 7 is set to be in the activation state.

(I) In the drag switch device 9, the spool 4 is attached to the distal end of the spool shaft 15 through the front drag mechanism 8 in a rotatable state. The front drag mechanism 8 is set to be in the activation state when the lock member 72 is interlocked with any one of the interlock portions 54a of the rotation member 54 and the rotation member 54 is accordingly prevented from rotating.

In this case, the spool shaft 15 is prevented from rotating with respect to the reel unit 2 when the rotation member 54 is locked and accordingly prevented from rotating. In response to this, the front drag mechanism 8 is set to be in the activation state. Therefore, the front drag mechanism 8 and the rear drag mechanism 7 can be activated or deactivated in conjunction with the locking or unlocking of the rotation member 54.

(J) The spinning reel of the second exemplary embodiment further includes the rear drag mechanism 107 for braking the spool shaft 115. In the drag switch device 109, the rotation member 254 is attached to the spool shaft 115 in a rotatable state. Simultaneously, the rotation member 254 forms a part of the intermediate drag mechanism 108 for braking the spool shaft 115. The intermediate drag mechanism 108 is set to be in the deactivation state when the lock member 72 is separated from the interlocked interlock portion 254a of the rotation member 254 and the rotation member 254 is accordingly unlocked. On the other hand, the intermediate drag mechanism 108 is set to be in the activation state when the lock member 72 is interlocked with any one of the interlock portions 254a and the rotation member 254 is accordingly locked.

In this case, the rotation member 254 is configured to be rotatable with respect to the spool shaft 115. When the rotation member 254 is locked, the spool shaft 115 is configured to be rotatable relative to the rotation member 254. Accordingly, the intermediate drag mechanism 108 is set to be in the activation state. On the other hand, the rear drag mechanism 107 is configured to be constantly in the activation state.

Other Embodiments

Exemplary embodiments of the present invention have been described above. However, the present invention is not limited to the foregoing exemplary embodiments. It should be noted that various changes and modifications can be made without departing from the scope of the present invention.

(a) In the first exemplary embodiment, the click gear 52 is designed to be a component of the rear drag mechanism 7. However, the rotation member 54 may be designed as a component of the rear drag mechanism 7, and drag washers may be disposed on the both sides of the rotation member 54.

(b) In the first and second exemplary embodiments, the rotation member and the drag washers are designed to be attached to the tubular member for preventing them from moving back and forth in conjunction with front-to-rear movement of the spool shaft. However, the tubular member is not necessarily provided when the rotation member and the drag washers are configured to be prevented from moving back and forth in conjunction with front-to-rear movement of the spool shaft.

(c) In the first and second exemplary embodiments, the drag washers are disposed on both sides of the click gear. The drag washers may be disposed on both sides of the rotation member for designing the rotation member as a component of the rear drag mechanism. In this case, the structure of the rear drag mechanism is simplified.

(d) In the first and second exemplary embodiments, the drag mechanisms are activated and deactivated by respectively allowing and preventing rotation of the rotation member with respect to the reel unit through locking and unlocking of the lock member. However, the drag mechanisms may be configured to be activated and deactivated when a clutch member (or clutch members) is moved in a spool shaft direction and engaged with or disengaged from the drag mechanisms.

General Interpretation of Terms

In understanding the scope of, the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of a spinning reel equipped with a drag switch device. Accordingly, these terms, as utilized to describe the present invention should be interpreted relative to a spinning reel equipped with a drag switch device as normally used. Finally, terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A spinning-reel drag switch device configured to switch a first drag mechanism between an activation state and a deactivation state, the first drag mechanism configured to brake a spool attached to a reel unit of a spinning reel, the spinning reel including a fishing-line winding handle, a reel body, and a fishing-rod attachment, the spinning reel configured to reel out a fishing line forward, the spinning-reel drag switch device comprising:

an operation member attached to the reel body and being pivotable about a first axis between a first position and a second position, the second position being different from the first position, a first distance between the first axis and the fishing-rod attachment being smaller than a second distance between the fishing-rod attachment and a rotation shaft of the handle having a first gear member being unitarily rotatable therewith, the first axis being positioned to extend in parallel to the rotation shaft and to interpose the rotation shaft between the first axis and the spool;

a switch mechanism setting the first drag mechanism in the activation state when the operation member is pivoted to the first position, the switch mechanism setting the first drag mechanism in the deactivation state when the operation member is pivoted to the second position; and a return mechanism including
a first arm being pivotable in conjunction with the operation member,
a second gear member rotating about a second axis parallel to the first axis, the second axis being positioned to interpose the rotation shaft between the second axis and the spool, a third distance between the second axis and the fishing-rod attachment being greater than the second distance, the second gear member configured to receive rotation force from the first gear member, and
a press member mounted to the second gear member to press the first arm, and
the return mechanism pressing the first arm in conjunction with rotation of the handle in a fishing line winding direction to return the operation member to the first position from the second position.

2. The spinning-reel drag switch device according to claim 1, wherein
the second gear member meshes with the first gear member and forms a part of an oscillation mechanism configured to reciprocate the spool back and forth, and
the press member is coupled to the second gear member while being relatively rotatable with the second gear member in a predetermined range and unitarily rotatable outside the predetermined range.

3. The spinning-reel drag switch device according to claim 2, wherein the switch mechanism includes
a rotation member that is selectively unitarily rotatable with or rotatable with respect to a spool shaft to which the spool is coupled to a distal end, the rotation member is mounted to the reel unit while being prevented from moving back and forth relative to the reel unit, the rotation member has a plurality of interlock portions circumferentially formed on the outer periphery thereof at predetermined intervals, and
a lock member that is movable to an interlock position and a separate position, the lock member is interlocked with any one of the plurality of interlock portions to prevent rotation of the rotation member in the interlock position, the lock member is separated from the rotation member to allow rotation of the rotation member in the separate position, the lock member moves to the interlock position or the separate position in conjunction with pivoting of the operation member to the first position or the second position.

4. The spinning-reel drag switch device according to claim 3, wherein
the return mechanism further includes a first urging member that urges the press member in a rotation direction of the second gear member, the rotation direction corresponding to the fishing line winding direction.

5. The spinning-reel drag switch device according to claim 3, wherein
the second gear member includes a cam protrusion on a first surface thereof, the cam protrusion interlocks with a cam receiver formed on a slider of the oscillation mechanism to reciprocate the spool back and forth in response to rotation of the handle, and
the press member is coupled to a second surface of the second gear member, the second surface being opposed to the first surface.

6. The spinning-reel drag switch device according to claim 3, wherein
the operation member includes
a shaft part that is disposed along the first axis, the shaft part is provided with the first arm, and the shaft part is attached to the reel unit in a rotatable state,
an operation part that is mounted to the shaft part while being unitarily rotationally movable with the shaft part, the operation part extends from the shaft part in a radial outward direction, and the operation part has a distal end that outwardly protrudes from the reel unit, and
a second arm that is mounted to the shaft part while being unitarily rotatable with the shaft part, the second arm is configured to press the lock member to the separate position from the interlock position, and
the switch mechanism includes a second urging member that urges the lock member towards the interlock position.

7. The spinning-reel drag switch device according to claim 3, further comprising
a tubular member that is attached to the spool shaft while being axially movable and unitarily rotatable with the spool shaft, the tubular member being prevented from moving back and forth with respect to the reel unit, and
wherein the rotation member is attached to the outer peripheral surface of the tubular member while being unitarily rotatable with to the tubular member.

8. The spinning-reel drag switch device according to claim 3, further comprising
a tubular member that is attached to the spool shaft while being axially movable and unitarily rotatable with the spool shaft, the tubular member being prevented from moving back and forth with respect to the reel unit, and
wherein the rotation member is attached to the outer peripheral surface of the tubular member while being rotatable with respect to the tubular member.

9. The spinning-reel drag switch device according to claim 3, wherein
the spool shaft is connected to a second drag mechanism, and
the rotation member is mounted to the spool shaft while being unitarily rotatable with the spool shaft, and the second drag mechanism is set to be in the activation state when rotation of the rotation member is allowed in conjunction with separation of the lock member from any one of the interlock portions of the rotation member.

10. The spinning-reel drag switch device according to claim 9, wherein
the spool is attached to the distal end of the spool shaft through the first drag mechanism in a rotatable state, and the first drag mechanism is set to be in the activation state when rotation of the rotation member is prevented in conjunction with interlocking of the lock member with any one of the interlock portions of the rotation member.

11. The spinning-reel drag switch device according to claim 3, wherein
the spool shaft is connected to a second drag mechanism, and
the rotation member is mounted to the spool shaft in a rotatable state and forms a part of the first drag mechanism, and the first drag mechanism is set to be in the deactivation state when rotation of the rotation member is allowed in conjunction with separation of the lock member from any one of the interlock portions of the rotation member, and the first drag mechanism is set to be in the activation state when rotation of the rotation member is prevented in conjunction with interlocking of the lock member with any one of the interlock portions of the rotation member.

12. A spinning reel comprising:
a reel unit having a front side, a rear side, an upper side, and a lower side, the reel unit having
a reel body, and
a fishing rod attachment located on the upper side of the reel unit;
a rotor having a rear side being rotatably supported by the reel unit and being located on the front side of the reel unit;
a spool being disposed on a front side of the rotor opposite the rear side of the rotor;
a drag mechanism having an activation state to brake the spool, and a deactivation state to release braking of the spool;
a fishing-line winding handle configured to cause the rotor to rotate when the handle is rotated, the handle having
a rotation shaft, and
a first gear member being unitarily rotatable with the handle; and
a spinning-reel drag switch device configured to switch the drag mechanism between an activation state and a deactivation state, the spinning-reel drag switch device comprising
an operation member attached to the reel body and being pivotable about a first axis between a first position and a second position, the second position being different from the first position, a first distance between the first axis and the fishing-rod attachment being smaller than a second distance between the fishing-rod attachment and the rotation shaft of the handle, the first axis being positioned to extend in parallel to the rotation shaft and to interpose the rotation shaft between the first axis and the spool,
a switch mechanism setting the first drag mechanism in the activation state when the operation member is pivoted to the first position, the switch mechanism setting the first drag mechanism in the deactivation state when the operation member is pivoted to the second position, and
a return mechanism including
a first arm being pivotable in conjunction with the operation member,
a second gear member rotating about a second axis parallel to the first axis, the second axis being positioned to interpose the rotation shaft between the second axis and the spool, a third distance between the second axis and the fishing-rod attachment being greater than the second distance, the second gear member configured to receive rotation force from the first gear member, and a press member mounted to the second gear member to press the first arm, and the return mechanism pressing the first arm in conjunction with rotation of the handle in a fishing line winding direction to return the operation member to the first position from the second position.

* * * * *